United States Patent [19]
Kato et al.

[11] Patent Number: 5,647,647
[45] Date of Patent: Jul. 15, 1997

[54] DECELERATION CONTROL DEVICE FOR VEHICLE

[75] Inventors: Kazuhiro Kato; Yoichi Miyawaki; Hirohisa Tanaka, all of Itami, Japan

[73] Assignee: Sumitomo Electric Industries, Ltd., Osaka, Japan

[21] Appl. No.: 456,869

[22] Filed: Jun. 1, 1995

[30] Foreign Application Priority Data

Aug. 24, 1994 [JP] Japan ..................... 6-199460

[51] Int. Cl.$^6$ ..................... B60T 8/28
[52] U.S. Cl. ..................... 303/122.09; 303/155; 303/166; 303/177
[58] Field of Search ..................... 303/122.01, 122, 303/122.04, 122.05, 122.06, 122.07, 122.09, 122.1, 181, 182, 183, 184, 185, 177, 178, DIG. 3, DIG. 4, 166, 155

[56] References Cited

U.S. PATENT DOCUMENTS

| | | | |
|---|---|---|---|
| 4,841,446 | 6/1989 | Leiber et al. | 303/122.01 |
| 5,333,944 | 8/1994 | Shirai et al. | 303/177 |
| 5,372,412 | 12/1994 | Yagi | 303/122.09 |

FOREIGN PATENT DOCUMENTS

| | | |
|---|---|---|
| 5-105045 | 4/1993 | Japan . |
| 6-20876 | 3/1994 | Japan . |

*Primary Examiner*—Matthew C. Graham
*Attorney, Agent, or Firm*—Greenblum & Bernstein P.L.C.

[57] ABSTRACT

A deceleration control device for a vehicle receives signals from an acceleration sensor, a speed sensor, and a brake fluid pressure sensor to calculate a brake fluid pressure control value to output a control signal to a brake pressure fluid control device. The deceleration control device may include a first arithmetic unit for calculating an actual deceleration of the vehicle, a second arithmetic unit for calculating a speed of the vehicle, a third arithmetic unit for calculating a target deceleration, and a fourth arithmetic unit for calculating the brake fluid pressure control command value. The first arithmetic unit may be coupled to the acceleration sensor signal and the speed sensor signal, the second arithmetic unit may be coupled to either the speed sensor signal or output of the first arithmetic unit, and the third arithmetic unit may be coupled to receive signals indicative of a stepping force of a brake pedal or a distance between the vehicle and an obstacle.

14 Claims, 22 Drawing Sheets

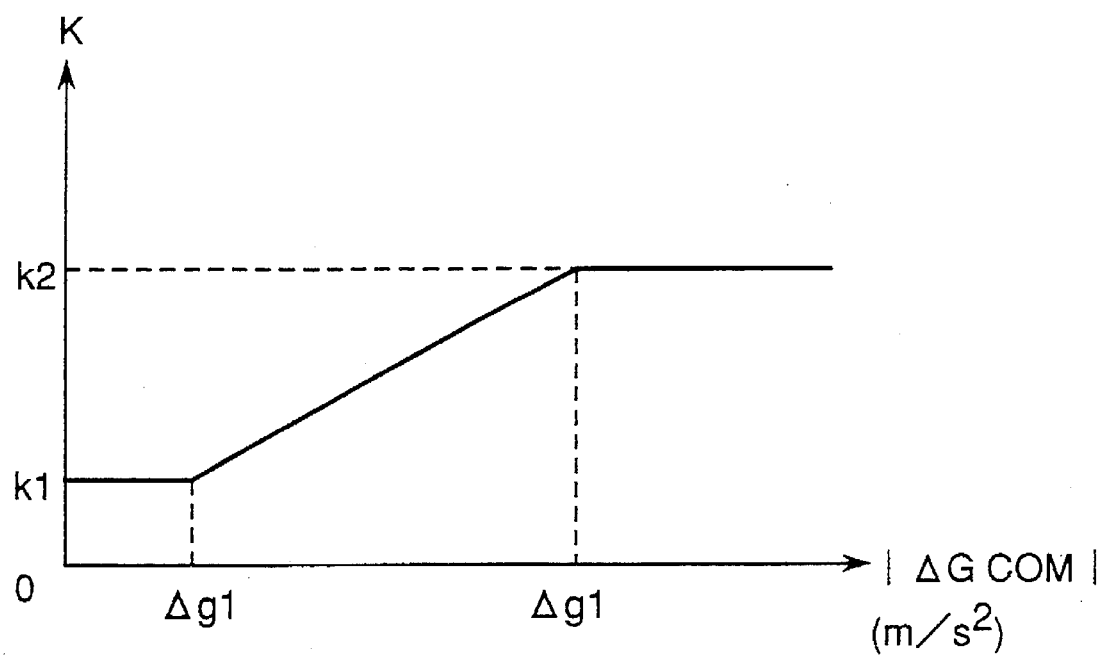

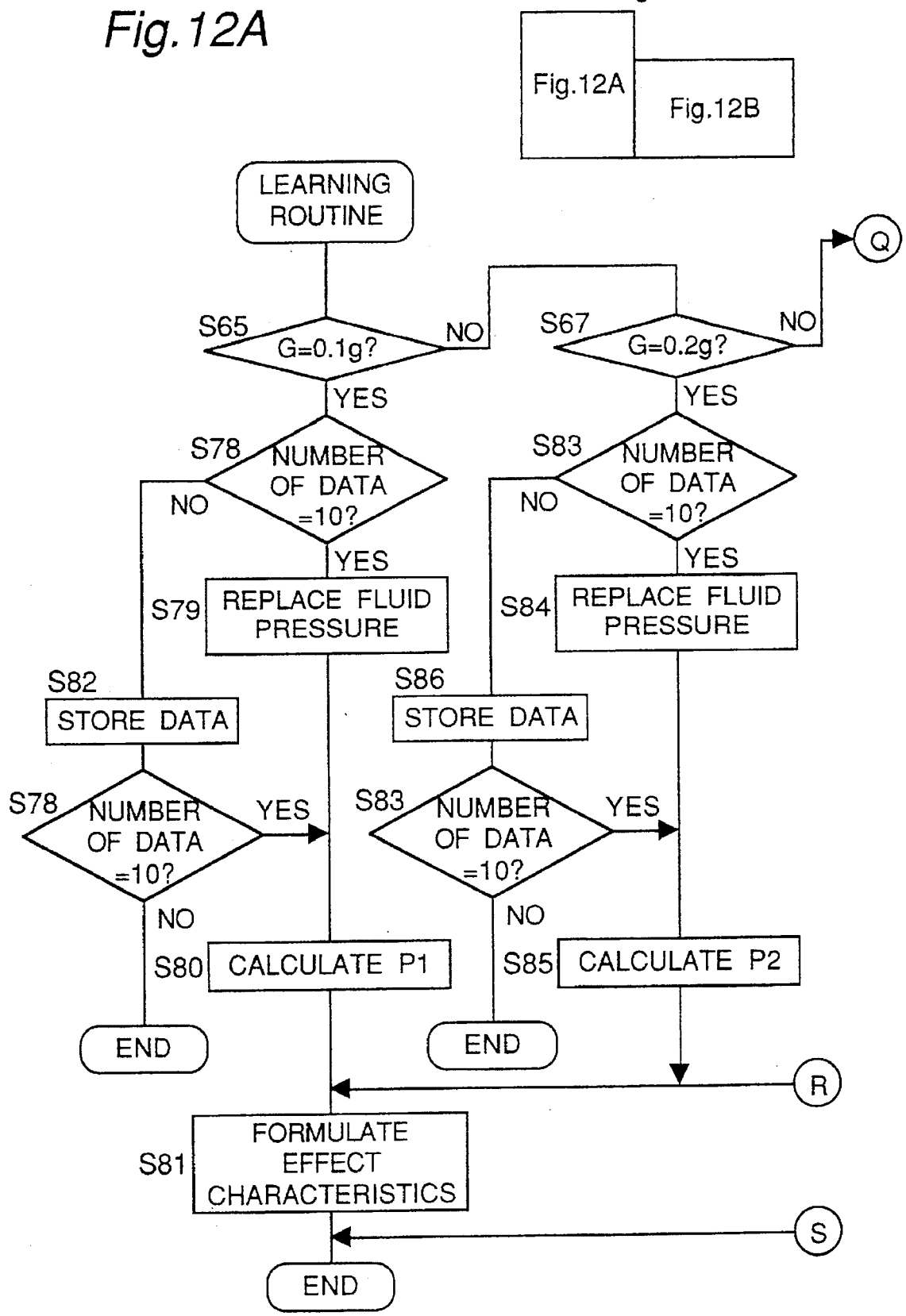

DECELERATION CONTROL DEVICE FOR VEHICLE

BACKGROUND OF THE INVENTION

The present invention relates to a deceleration control device for a vehicle, which detects deceleration of the vehicle so as to control the deceleration to a target deceleration, for example, a deceleration control device for a vehicle of unmanned operation, which runs in a predetermined acceleration and deceleration pattern or whose acceleration and deceleration are subjected to remote control or computer control, a deceleration control device for avoiding collision between a vehicle and a preceding vehicle from distance between the vehicle and the preceding vehicle and speed of the vehicle and a deceleration control device which is capable of keeping deceleration due to stepping stroke or stepping force of a brake pedal, constant irrespective of weight of a vehicle, wear of brake pads, etc.

In a prior art deceleration control device for a vehicle, relation between brake fluid pressure and deceleration is stored, as a map, in a memory and a brake fluid pressure corresponding to a target deceleration is read out of the memory such that brake fluid pressure is set to the value read out of the memory.

Japanese Patent Laid-Open Publication No. 5-105045 (1993) discloses a method of controlling deceleration of a vehicle in a system for preventing bump of the vehicle against a preceding motor vehicle from behind. In the deceleration control method of this prior art document, decelerations, which represent accelerations or decelerations of the vehicle, are calculated from a plurality of sensors composed of acceleration or deceleration sensors, etc. Even when speed of the vehicle is low, deceleration closer to an actual value is obtained by taking a variance mean of the decelerations calculated from the sensors, so that hydraulic pressure of a hydraulic brake can be controlled accurately and thus, impact prior to stop of the vehicle can be lessened.

Meanwhile, in known deceleration control devices, in case various detection means necessary for deceleration control, e.g., a speed detection means and an acceleration or deceleration detection means fail, safety is secured by prohibiting deceleration control.

However, when speed of the vehicle is low, it is difficult to accurately calculate deceleration of the vehicle. In order to solve this problem, the prior art document referred to above teaches that the variance mean of the decelerations calculated from the sensors is taken. However, such a problem arises that calculation for taking the variance mean lays a rather heavy burden on a microcomputer. Meanwhile, when speed of the vehicle is low, brake fluid pressure is replaced with deceleration from predetermined relation between brake fluid pressure and deceleration of the vehicle. However, the predetermined relation between brake fluid pressure and deceleration of the vehicle varies according to changes of characteristics of a brake system due to wear of tires, wear of brake pads, etc. Thus, if relation between brake fluid pressure and deceleration of the vehicle is merely stored, as the map, in the memory initially, the relation changes with time disadvantageously.

Furthermore, if deceleration control is prohibited in an unmanned vehicle when various detection means necessary for deceleration control, e.g., a speed detection means and an acceleration or deceleration detection means fail, there is no means for stopping the vehicle. In order to solve this problem, a preliminary stop means is required to be provided additionally.

SUMMARY OF THE INVENTION

Accordingly, an essential object of the present invention is to provide a deceleration control device for a vehicle, which eliminates the above mentioned drawbacks of conventional deceleration control devices.

In order to accomplish this object of the present invention, a deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the actual brake fluid pressure, according to the present invention comprises: a first arithmetic unit for calculating an actual deceleration of the vehicle from signals from the speed detection means and the acceleration or deceleration detection means; a second arithmetic unit for calculating a speed of the vehicle from the signal from the speed detection means; a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value; wherein when the speed of the vehicle inputted to the fourth arithmetic unit from the second arithmetic unit is low, the fourth arithmetic unit calculates by predetermined braking effectiveness of the vehicle a target brake fluid pressure corresponding to the target deceleration and calculates the brake fluid pressure control command value such that the actual brake fluid pressure coincides with the target brake fluid pressure.

In accordance with the present invention, when it is judged that the speed of the vehicle is low, the target brake fluid pressure corresponding to the target deceleration is calculated by the predetermined braking effectiveness of the vehicle and the brake fluid pressure control command value is calculated so as to cause the actual brake fluid pressure to coincide with the target brake fluid pressure by feeding a difference between this target brake fluid pressure and the actual brake fluid pressure back to the actual brake fluid pressure such that a desired deceleration is obtained. Thus, when the speed of the vehicle is not low, ordinary deceleration control is performed. Meanwhile, when the speed of the vehicle is low, the target deceleration is replaced with the target brake fluid pressure by the predetermined relation between the deceleration and the brake fluid pressure and a command on the brake fluid pressure is issued such that the actual brake fluid pressure coincides with the target brake fluid pressure. As a result, shocks of the vehicle prior to stop of the vehicle can be lessened by simple calculations.

BRIEF DESCRIPTION OF THE DRAWINGS

This objects and features of the present invention will become apparent from the following description taken in conjunction with the preferred embodiments thereof with reference to the accompanying drawings, in which:

FIG. 9 is a graph showing relation between weight factor K and amount |ΔGCOM|;

FIGS. 12A and 12B are flowcharts showing another example of the routine for learning braking effectiveness of the vehicle at step S60 in the flowchart of FIG. 10B;

Before the description of the present invention proceeds, it is to be noted that like parts are designated by like reference numerals throughout several views of the accompanying drawings.

DETAILED DESCRIPTION OF THE INVENTION

Figure 1:
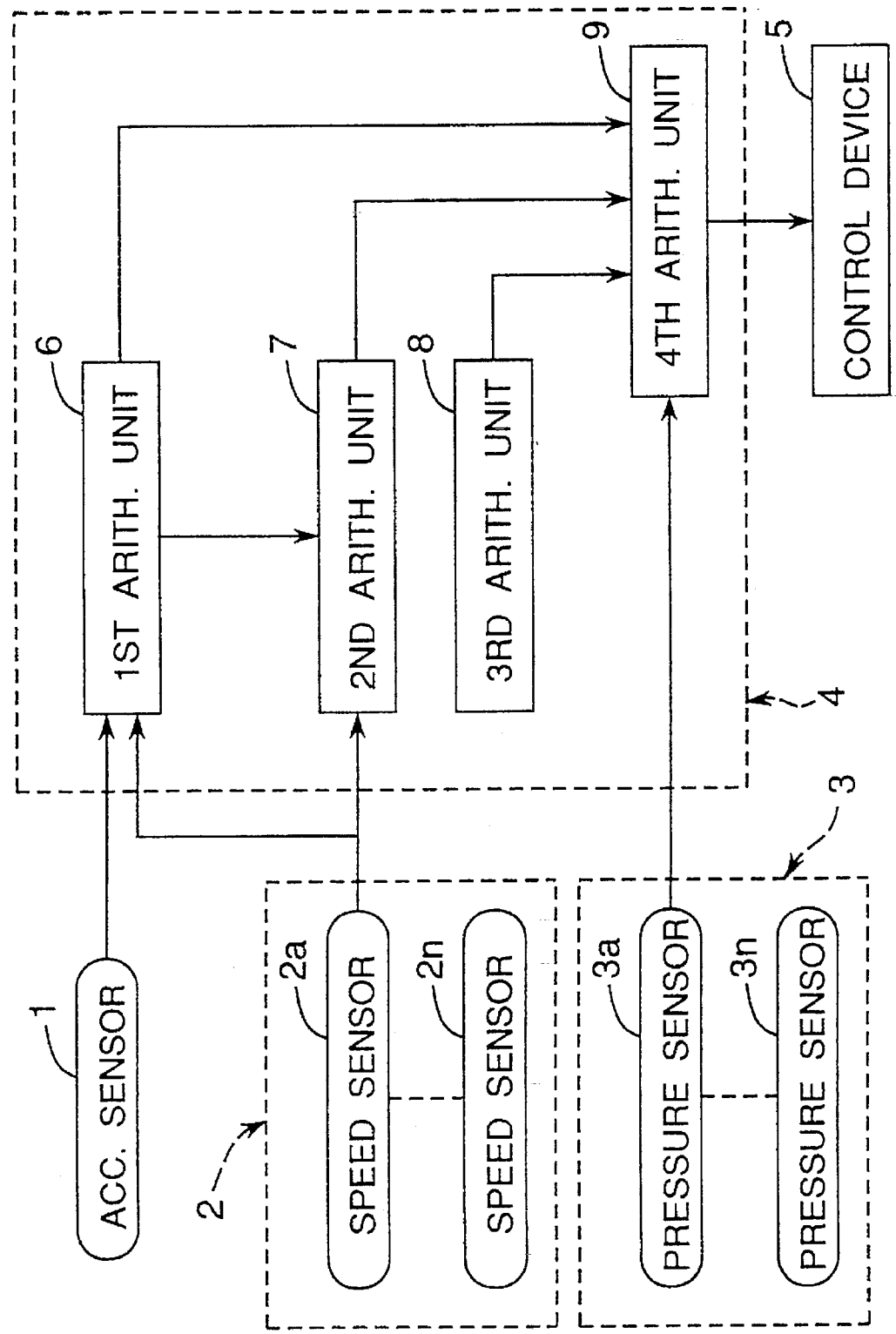
FIG. 1 is a schematic block diagram of a deceleration control device according to a first embodiment of the present invention.
Figure 2:
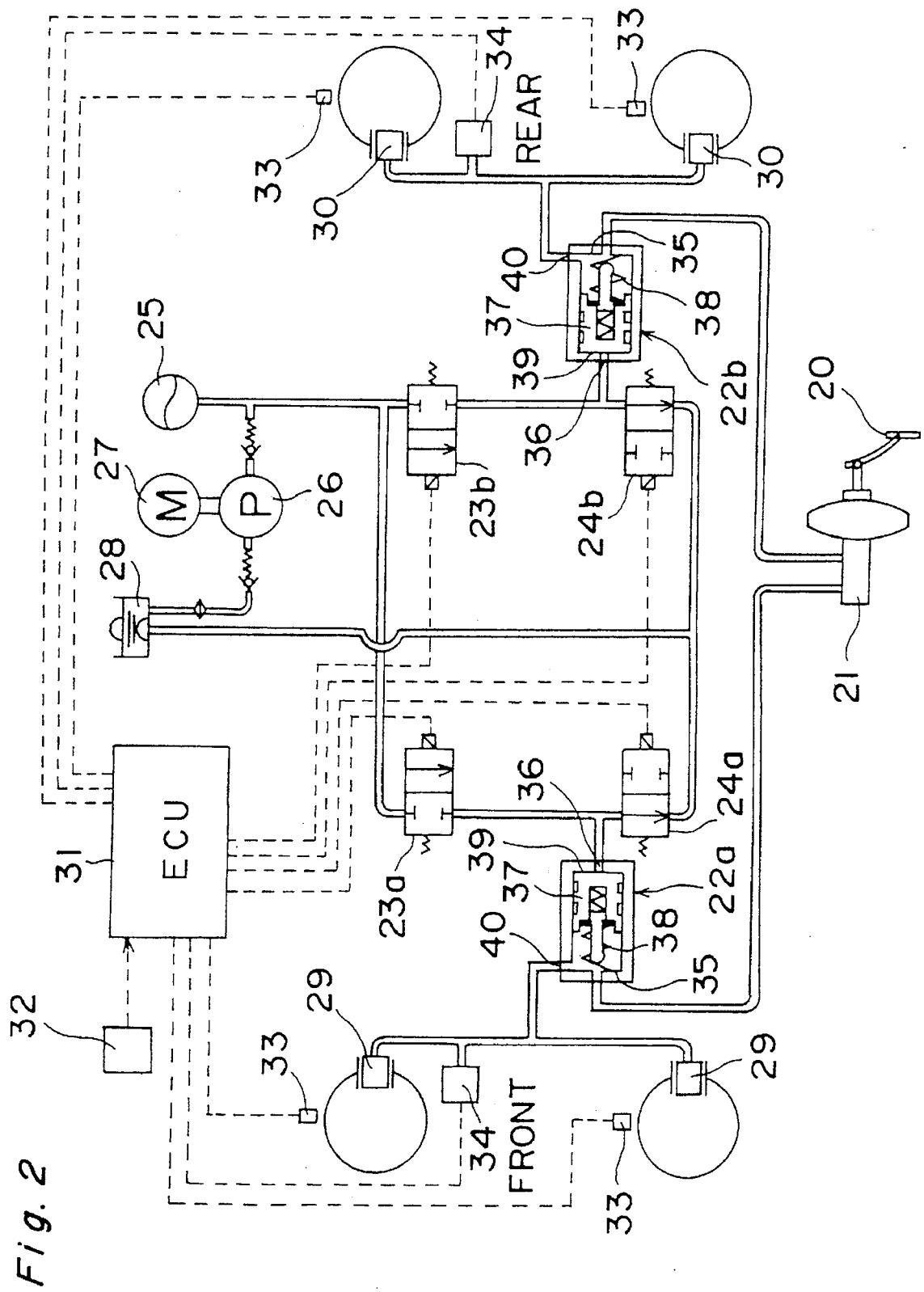
FIG. 2 is a schematic view showing one example of a deceleration control system for a four-wheel motor vehicle, to which the deceleration control device of FIG. 1 is applied.

Referring now to the drawings, FIG. 1 shows a deceleration control device 4 for a vehicle, according to a first embodiment of the present invention, while FIG. 2 shows one example of a deceleration control system for a four-wheel motor vehicle, to which the deceleration control device 4 is applied. In FIG. 1, the vehicle includes an acceleration sensor 1 acting as an acceleration or deceleration detection means for detecting acceleration or deceleration of the vehicle, a speed sensor 2 acting as a speed detection means and composed of one or more wheel speed sensors 2a to 2n for detecting rotational speed of wheels, a brake fluid pressure sensor 3 acting as a brake fluid pressure detection means and composed of one or more fluid pressure sensors 3a to 3n and a brake fluid pressure control device 5 for increasing, reducing or holding brake fluid pressure.

The deceleration control device 4 calculates from signals from the acceleration sensor 1, the speed sensor 2 and the brake fluid pressure sensor 3, a brake fluid pressure control command value ΔP acting as a control signal for the brake fluid pressure control device 5 so as to output the control signal to the brake fluid pressure control device 5. The deceleration control device 4 includes a first arithmetic unit 6 for calculating an actual deceleration G of the vehicle from the signals from the acceleration sensor 1 and the speed sensor 2, a second arithmetic unit 7 for calculating a speed V of the vehicle from the signal from the speed sensor 2 or the actual deceleration G of the vehicle calculated by the first arithmetic unit 6, a third arithmetic unit 8 for calculating a target deceleration $G_T$ from stepping stroke and stepping force of a brake pedal or distance between the vehicle and an obstacle including another vehicle and speed of the vehicle and a fourth arithmetic unit 9 for calculating the brake fluid pressure control command value ΔP acting as a signal for controlling the brake fluid pressure control device 5. Meanwhile, the target deceleration $G_T$ may be transmitted to the third arithmetic unit 8 from outside through communication.

In the above described arrangement, the acceleration sensor 1 is connected to the first arithmetic unit 6, while the wheel speed sensors 2a to 2n of the speed sensor 2 are connected to the first and second arithmetic units 6 and 7. Meanwhile, the fluid pressure sensors 3a to 3n of the brake fluid pressure sensor 3 are connected to the fourth arithmetic unit 9 and the first arithmetic unit 6 is connected to the second arithmetic unit 7. Furthermore, the fourth arithmetic unit 9 is connected to the first to third arithmetic units 6 to 8 and the brake fluid pressure control device 5.

From an acceleration or deceleration value transmitted from the acceleration sensor 1 and speed values transmitted from the wheel speed sensors 2a to 2n, the first arithmetic unit 6 calculates the actual deceleration G. From the signals from the wheel speed sensors 2a to 2n or the actual deceleration G calculated by the first arithmetic unit 6, the second arithmetic unit 7 calculates the speed V of the vehicle. The third arithmetic unit 8 calculates the target deceleration $G_T$ from stepping stroke or stepping force of the brake pedal or distance between the vehicle and an obstacle including another vehicle and speed of the vehicle. Meanwhile, in the following description, the speed sensor 2 and the brake fluid pressure sensor 3 are employed in place of the wheel speed sensors 2a to 2n and the fluid pressure sensors 3a to 3n, respectively.

Meanwhile, the fourth arithmetic unit 9 calculates a difference ΔG between the target deceleration $G_T$ calculated by the third arithmetic unit 8 and the actual deceleration G calculated by the first arithmetic unit 6 and calculates the brake fluid pressure control command value ΔP corresponding to the difference ΔG from braking effectiveness of the vehicle so as to output the brake fluid pressure control value ΔP to the brake fluid pressure control device 5. Alternatively, the fourth arithmetic unit 9 converts the target deceleration $G_T$ into a target brake fluid pressure $P_T$ on the basis of the braking effectiveness of the vehicle and calculates the brake fluid pressure control value ΔP from a difference between the target brake fluid pressure $P_T$ and an actual brake fluid pressure P transmitted from the brake fluid pressure sensor 3 so as to output the brake fluid pressure control value ΔP to the brake fluid pressure control device 5.

With reference to FIG. 2, one example of the deceleration control system for the four-wheel motor vehicle, to which the deceleration control device 4 is applied is described. The deceleration control system shown in FIG. 2 is known and thus, is described briefly. In FIG. 2, the deceleration control system includes a brake pedal 20, a master cylinder 21, fluid pressure control valves 22a and 22b for controlling brake fluid pressure, normally closed solenoid valves 23a and 23b at an inlet side, normally open solenoid valves 24a and 24b at an outlet side, an accumulator 25, a high-pressure pump 26, a pump motor 27 for driving the high-pressure pump 26 and a hydraulic reservoir tank 28.

Meanwhile, the deceleration control system further includes a pair of brake wheel cylinders 29 for front wheels, a pair of brake wheel cylinders 30 for rear wheels, an electronic control unit (ECU) 31, an acceleration sensor 32, four wheel speed sensors 33 for the four wheels and a pair of brake fluid pressure sensors 34. Each of the fluid pressure control valves 22a and 22b has a cylindrical shape. A seat 35 having an input/output port for brake fluid is provided at one open end of each of the fluid pressure control valves 22a and 22b, while an input/output port 36 is provided at the other open end of each of the fluid pressure control valves 22a and 22b. In each of the fluid pressure control valves 22a and 22b, there are provided a piston 37, a spring 38 for adjusting displacement of the piston 37, which is disposed between the seat 35 and the piston 37, a fluid pressure control chamber 39 having the input/output port 36, whose volume increases or decreases upon displacement of the piston 37 and an input/output port 40 extending orthogonally to direction of displacement of the piston 37 between the fluid pressure control chamber 39 and the seat 35.

The input/output port of the seat 35 of each of the fluid pressure control valves 22a and 22b is connected with the master cylinder 21 and the input/output port 40 of the fluid pressure control valve 22a is connected with the brake wheel cylinders 29 for the front wheels. Meanwhile, the input/output port 40 of the fluid pressure control valve 22b is connected with the brake wheel cylinders 30 for the rear wheels.

One port of the solenoid valve 23a at the inlet side and one port of the solenoid valve 24a at the outlet side are connected with each other, while the input/output port 36 of the fluid pressure control chamber 39 of the fluid pressure control valve 22a is connected with a junction of the ports of the solenoid valves 23a and 24a. Similarly, one port of the solenoid valve 23b at the inlet side and one port of the solenoid valve 24b at the outlet side are connected with each other, while the input/output port 36 of the fluid pressure control chamber 39 of the fluid pressure control valve 22b is connected with a junction of the ports of the solenoid valves 23b and 24b.

Meanwhile, the other port of the solenoid valve 24a at the outlet side and the other port of the solenoid valve 24b at the outlet side are connected with each other and are led to the hydraulic reservoir tank 28. Furthermore, the other port of the solenoid valve 23a at the inlet side and the other port of the solenoid valve 23b at the inlet side are connected with each other and are led to the accumulator 25. The accumulator 25 is connected with the high-pressure pump 26 via a check valve and the high-pressure pump 26 is, in turn, connected with the hydraulic reservoir tank 28 through a check valve.

Meanwhile, the wheel speed sensors 33 are provided for the wheels, respectively and the brake fluid pressure sensors 34 are, respectively, provided in a pipe connecting the brake wheel cylinders 29 for the front wheels and a pipe connecting the brake wheel cylinders 30 for the rear wheels. The wheel speed sensors 33 and the brake fluid pressure sensors 34 are connected to the electronic control unit 31. The electronic control unit 31 is further connected to the acceleration sensor 32 and the solenoid valves 23a, 23b, 24a and 24b so as to drive the solenoid valves 23a, 23b, 24a and 24b.

In the deceleration control system of the above described arrangement, when deceleration control is not performed, the solenoid valves 23a and 23b at the inlet side are closed and the solenoid valves 24a and 24b at the outlet side are opened, so that pressure in the fluid pressure control chamber 30 assumes zero and thus, the piston 37 is spaced away from the seat 35 by urging force of the spring 38. Hence, brake fluid pressure produced in the master cylinder 21 by stepping on the brake pedal 20 is transmitted to the brake wheel cylinders 29 and 30 as it is.

Subsequently, when deceleration control is performed, the electronic control unit 31 which has received a control command not only excites the solenoid valves 24a and 24b at the outlet side so as to close the solenoid valves 24a and 24b but excites the solenoid valves 23a and 23b at the inlet side as necessary so as to open the solenoid valves 23a and 23b such that only a required amount of high-pressure brake fluid stored in the accumulator 25 is introduced into the fluid pressure control chambers 39 of the fluid pressure control valves 22a and 22b. As a result, the piston 37 is displaced towards the seat 35 so as to close the input/output port of the seat 35. When the piston 37 is further displaced towards the seat 35, brake fluid present between the piston 37 and the seat 35 is fed from the input/output port 40 to a corresponding one of the brake wheel cylinders 29 and 30 such that brake fluid pressure is produced.

When the electronic control unit 31 interrupts excitation of only the solenoid valves 23a and 23b at the inlet side, the solenoid valves 23a and 23b are closed, so that inflow and outflow of brake fluid of the brake wheel cylinders 29 and 30 do not take place and thus, brake fluid pressure is kept constant.

If excitation of each of the solenoid valves 23a and 23b at the inlet side and the solenoid valves 24a and 24b at the outlet side is interrupted, brake fluid in the fluid pressure control chamber 39 is discharged from the input/output 36 to the hydraulic reservoir tank 28, so that the piston 37 is displaced towards the input/output port 36 by urging force of the spring 38 and thus, brake fluid in a corresponding one of the brake wheel cylinders 29 and 30 is introduced in between the seat 35 and the piston 37 from the input/output port 40. As a result, brake fluid pressure in each of the brake wheel cylinders 29 and 30 is reduced. If the piston 37 is displaced further, the input/output of the seat 35 is opened, thereby resulting in an initial state.

Thus, by monitoring differential values of actual speeds obtained from the wheel speed sensors 33 and deceleration of the vehicle calculated from actual acceleration or deceleration obtained by the acceleration sensor 32, the electronic control unit 31 performs fine adjustment of brake fluid pressure.

Meanwhile, in the above described embodiment, if the brake pedal 20 is operated during deceleration control, the input/output port of the seat 35 is closed before brake fluid pressure of the master cylinder 21 exceeds brake fluid pressure of the brake wheel cylinders 29 and 30 under deceleration control. As a result, brake fluid is not fed from the master cylinder 21 to the brake wheel cylinders 29 and 30 and thus, braking force does not change. However, in case brake fluid pressure exceeding that of the brake wheel cylinders 29 and 30 under deceleration control is produced in the master cylinder 21, the seat 35 functions as a check valve such that brake fluid in the master cylinder 21 is fed to the brake wheel cylinders 29 and 30, so that it is possible to further step on the brake pedal 20.

Hereinafter, a first example of operation of the deceleration control device 4 applied to the deceleration control system of FIG. 2 is described with reference to flowcharts of FIGS. 3A to 8. Initially, in the flowchart of FIGS. 3A and 3B, the target deceleration $G_T$ is calculated by the third arithmetic unit 8 at step S1 and then, a check on failure of the acceleration sensor 1, the speed sensor 2 and the brake fluid pressure sensor 3 is performed by the first, second and fourth arithmetic units 6, 7 and 9, respectively at step S2 followed by step S3. Unless it is found at step S3 that all the sensors 1 to 3 fail, the program flow proceeds to step S4. Unless it is found at step S4 that all the sensors 1 and 2 fail, the program flow proceeds to step S5. Unless it is found at step S5 that all the wheel speed sensors 2a to 2n of the speed sensor 2 fail, the program flow proceeds to step S6. If it is found at step S6 that the acceleration sensor 1 does not fail, the program flow proceeds to step S7. Unless it is found at step S7 that all the fluid pressure sensors 3a to 3n of the brake fluid pressure sensor 3 fail, the program flow proceeds to step S8. If it is found at step S8 that all the fluid pressure sensors 3a to 3n of the brake fluid pressure sensor 3 function properly, the program flow proceeds to step S9.

At step S9, a weight factor K necessary for calculating the actual deceleration G of the vehicle is calculated by the first arithmetic unit 6. Conventionally, a differential value GV obtained by differentiating with respect to time actual speed obtained from the speed sensor 2 does not often cope with sudden change in countermeasures against noises in calculation of the actual deceleration G of the vehicle. In order to compensate for this deficiency, an acceleration or deceleration value GCOM obtained from the acceleration sensor 1 is employed. In order to calculate the actual deceleration G at this time, the weight factor K referred to above is used for performing weighting between the differential value GV and the acceleration or deceleration value GCOM. Meanwhile, the weight factor K ranges from 0 to 1, namely, 0<K<1.

Hereinafter, a method of setting the weight factor K in the case where all the speed sensor 2 and the acceleration sensor 1 function properly is described. It is supposed here that relation between absolute value of variate ΔGCOM of the acceleration or deceleration value GCOM in a predetermined period, i.e., |ΔGCOM| and the actual deceleration G of the vehicle is determined as shown in FIG. 9. In FIG. 9, when the absolute value |ΔGCOM| is smaller than a minimum threshold value Δg1, the weight factor K is fixed at a predetermined minimum value k1. On the other hand, when the absolute value |ΔGCOM| is larger than a maximum threshold value Δg2, the weight factor K is fixed at a predetermined maximum value k2. Meanwhile, in case the absolute value |ΔGCOM| satisfies the relation of (Δg1≦|ΔGCOM|≦Δg2), value of the weight factor K is determined from the following equation (1).

$$K = (k2-k1) \times |\Delta GCOM| / (\Delta g2 - \Delta g1) + \alpha \quad (1)$$

After the weight factor K has been calculated by the fourth arithmetic unit 9 at step S9, the actual deceleration G of the vehicle is further calculated by the first arithmetic unit 6 at step S10. The actual deceleration G is calculated from the following equation (2).

$$G = K \times GCOM + (1-K)GV \quad (2)$$

Then, the speed V of the vehicle is calculated from the signal from the speed sensor 2 by the second arithmetic unit 7 at step S11 followed by step S12. At step S12, the actual brake fluid pressure P is calculated from the signal from the brake fluid pressure sensor 3 by the fourth arithmetic unit 9 and the program flow proceeds to step S13. At step S13, it is judged by the fourth arithmetic unit 9 whether or not the speed V of the vehicle calculated by the second arithmetic unit 7 is smaller than a predetermined value V1, namely, the speed V of the vehicle is low speed. In the case of "YES" at step S13, the program flow proceeds to step S14. Here, the above low speed is so selected that accuracy of calculation of the actual deceleration G used for deceleration control drops to a level unusable for deceleration control. In case the wheel speed sensors 2a to 2n are used for calculation of the actual deceleration G, accuracy of the actual deceleration G usually deteriorates at 2 to 3 km/h.

Subsequently, at step S14, the target brake fluid pressure $P_T$ corresponding to the target deceleration $G_T$ is calculated from predetermined braking effectiveness of the vehicle by the fourth arithmetic unit 9. Meanwhile, the above mentioned braking effectiveness of the vehicle are characteristics indicative of relation between brake fluid pressure and deceleration of the vehicle.

Thereafter, a brake fluid pressure control command value ΔP which is a difference between the target brake fluid pressure $P_T$ and the actual brake fluid pressure P at is calculated at step S15 and the program flow proceeds to step S16. At step S16, the brake fluid pressure control command value ΔP is outputted from the fourth arithmetic unit 9 to the brake fluid pressure control device 5, so that the brake fluid pressure control device 5 controls brake fluid pressure in accordance with the brake fluid pressure control command value ΔP such that the actual brake fluid pressure P coincides with the target brake fluid pressure $P_T$. Then, the program flow returns to step S1.

Figure 4:
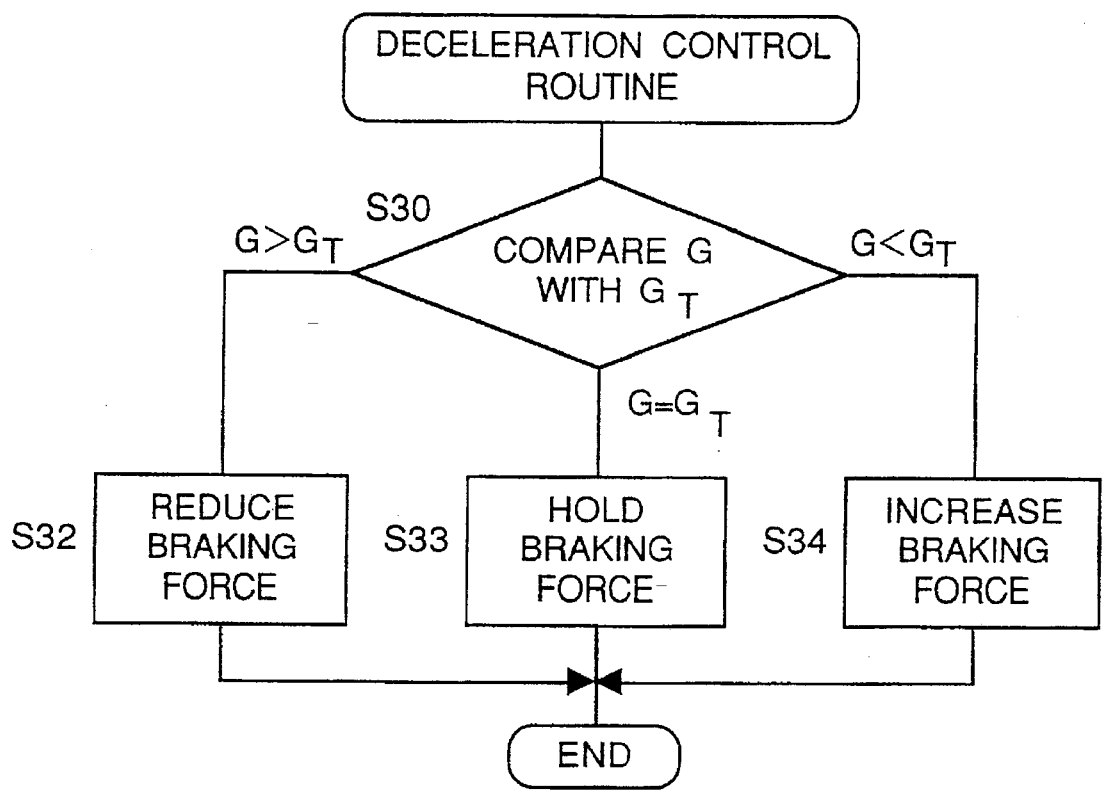
FIG. 4 is a flowchart showing a routine for deceleration control at step S17 of the flowchart of FIG. 3B.

Here, a subroutine of deceleration control at step S17 is described with reference to FIG. 4. This deceleration control is known and thus, is described briefly. Initially, at step S30, the fourth arithmetic unit 9 compares the actual deceleration G calculated by the first arithmetic unit 6 and the target deceleration $G_T$ calculated by the third arithmetic unit 8. If it is found at step S30 that the actual deceleration G exceeds the target deceleration $G_T$, i.e., G>$G_T$, the program flow proceeds to step S32. At step S32, the fourth arithmetic unit 9 calculates the brake fluid pressure control command value ΔP for reducing braking force so as to cause the actual deceleration G to coincide with the target deceleration $G_T$ and outputs the brake fluid pressure control command value ΔP to the brake fluid pressure control device 5, thereby resulting in end of the program flow.

Meanwhile, if it is found at step S30 that the actual deceleration G is equal to the target deceleration $G_T$, i.e., G=$G_T$, the program flow proceeds to step S33. At step S33, the fourth arithmetic unit 9 calculates the brake fluid pressure control command value ΔP for holding current braking force and outputs the brake fluid pressure control command value ΔP to the brake fluid pressure control device 5, thus resulting in end of the program flow. Furthermore, if it is found at step S30 that the actual deceleration G is smaller than the target deceleration $G_T$, i.e., G<$G_T$, the program flow proceeds to step S34. At step S34, the fourth arithmetic unit 9 calculates the brake fluid pressure control command value ΔP for increasing braking force so as to cause the actual deceleration G to coincide with the target deceleration $G_T$ and outputs the brake fluid pressure control command value ΔP to the brake fluid pressure control device 5, thereby resulting in end of the program flow.

Figure 3A:
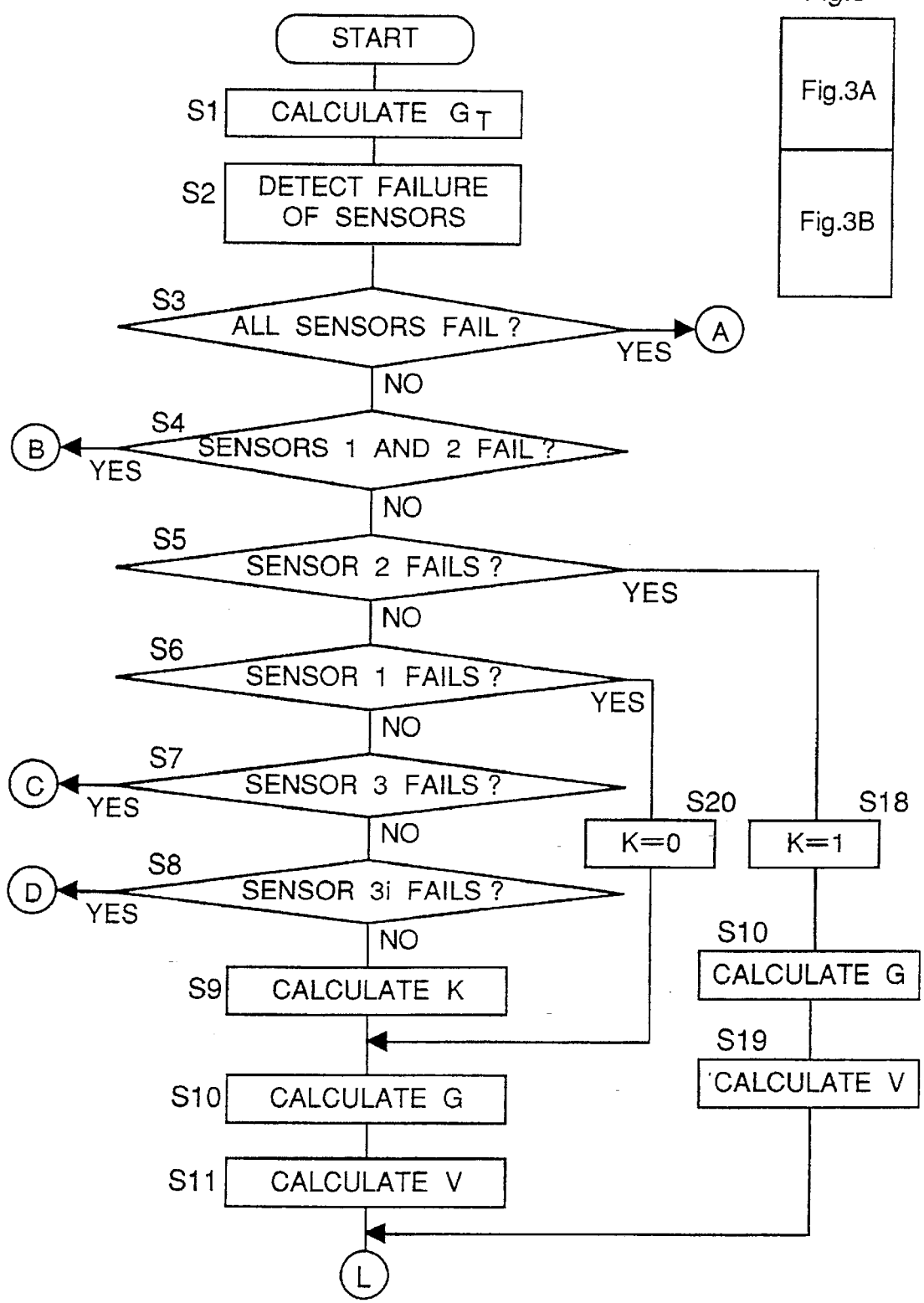
FIGS. 3A and 3B are flowcharts showing a first example of operation of the deceleration control device of FIG. 1.
Figure 3B:
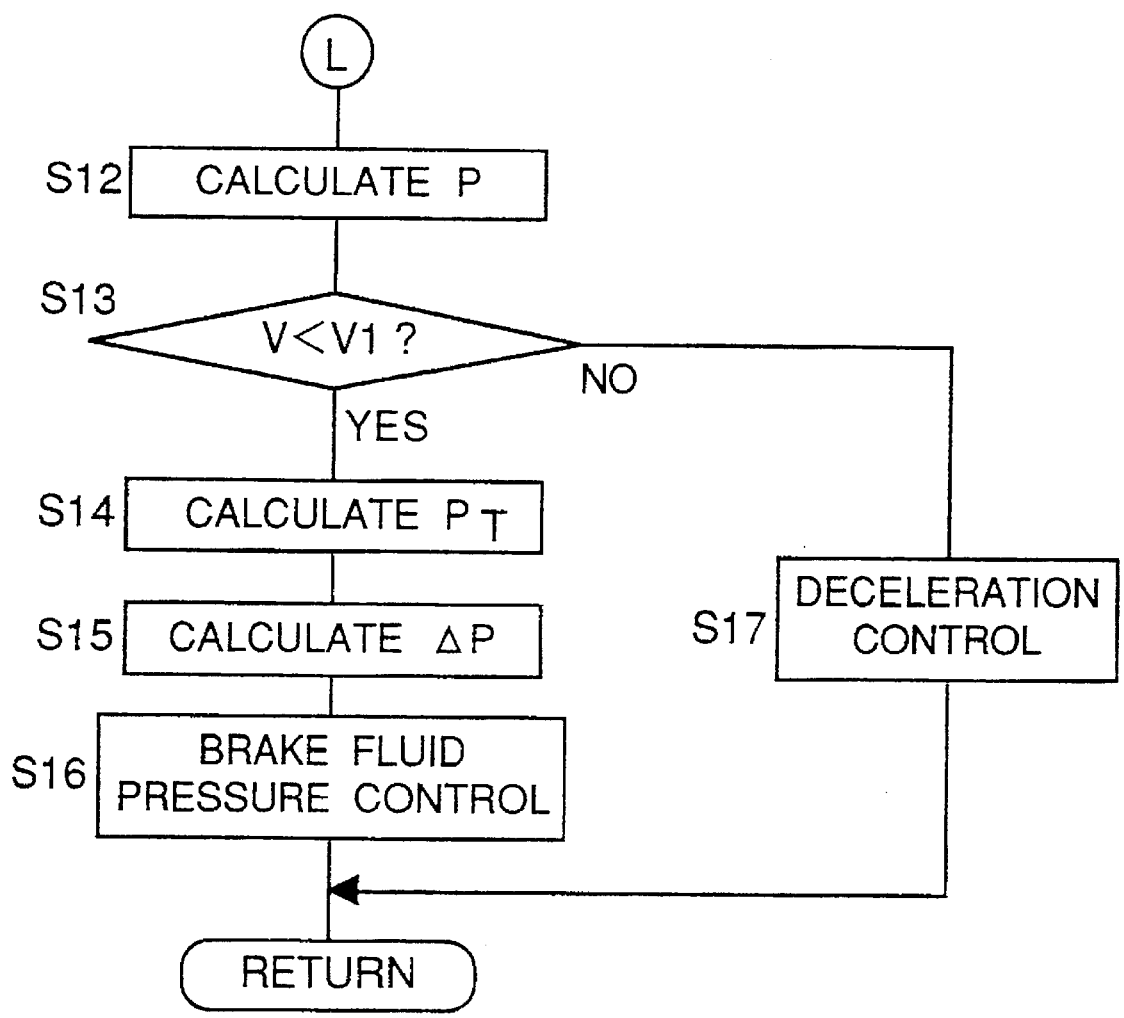
Figure 5:
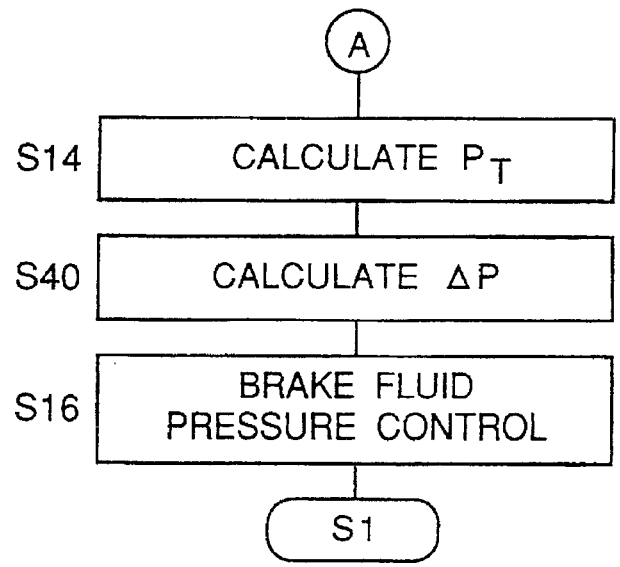
FIG. 5 is a flowchart showing a flow from step S3 of the flowchart of FIG. 3A.

Then, if it is found at step S3 in FIG. 3A that all the sensors 1 to 3 fail, namely, in the case of "YES" at step S3, processings shown in FIG. 5 are performed. In FIG. 5, steps identical with those of FIGS. 3A and 3B are designated by reference numerals identical with those of FIGS. 3A and 3B and are described briefly. In FIG. 5, the target brake fluid pressure $P_T$ is initially calculated at step S14 followed by step S40. At step S40, the brake fluid pressure control command value ΔP corresponding to the target brake fluid pressure $P_T$ preset from braking effect characteristics of the vehicle is calculated. Then, control of brake fluid pressure of step S16 is performed and then, the program flow returns to step S1.

Figure 6:
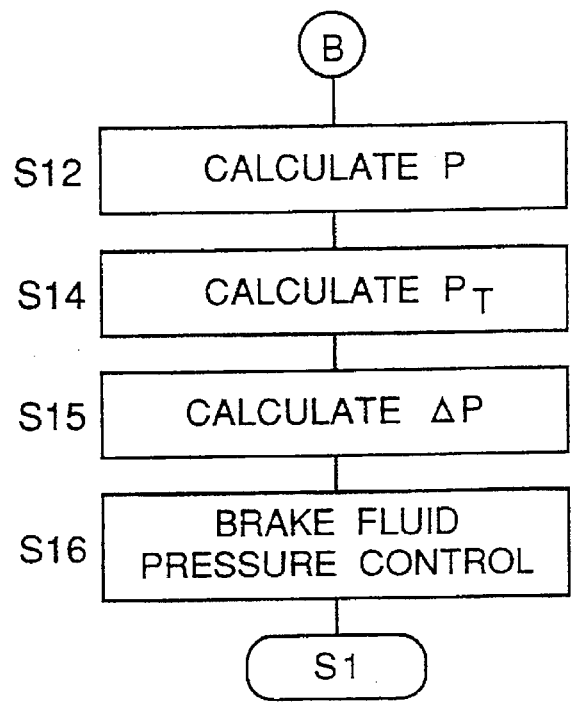
FIG. 6 is a flowchart showing a flow from step S4 of the flowchart of FIG. 3A.

Subsequently, if it is found at step S4 in FIG. 3A that all the sensors 1 and 2 fail, namely, in the case of "YES" at step S4, processings shown in FIG. 6 are performed. In FIG. 6, steps identical with those of FIGS. 3A and 3B are designated by reference numerals identical with those of FIGS. 3A and 3B and are described briefly. In FIG. 6, after the actual brake fluid pressure P has been initially calculated at step S12, processings of steps S14, S15 and S16 are performed sequentially and then, the program flow returns to step S1.

Then, if it is found at step S5 in FIG. 3A that all the wheel speed sensors 2a to 2n of the speed sensor 2 fail, namely, in the case of "YES" at step S5, the program flow proceeds to step S18. At step S18, the weight factor K of the equation (1) is set to 1. Thereafter, the actual deceleration G is calculated by the first arithmetic unit 6 at step S10 and then, the second arithmetic unit 7 integrates the actual deceleration G with respect to time so as to calculate the speed V of the vehicle at step S19. Subsequently, the program flow proceeds to step S12.

Meanwhile, if it is found at step S6 in FIG. 3A that the acceleration sensor 1 fails, namely, in the case of "YES" at step S6, the program flow proceeds to step S20. The weight factor K is set to 0 at step S20 and then, the program flow proceeds to step S10.

Figure 7:
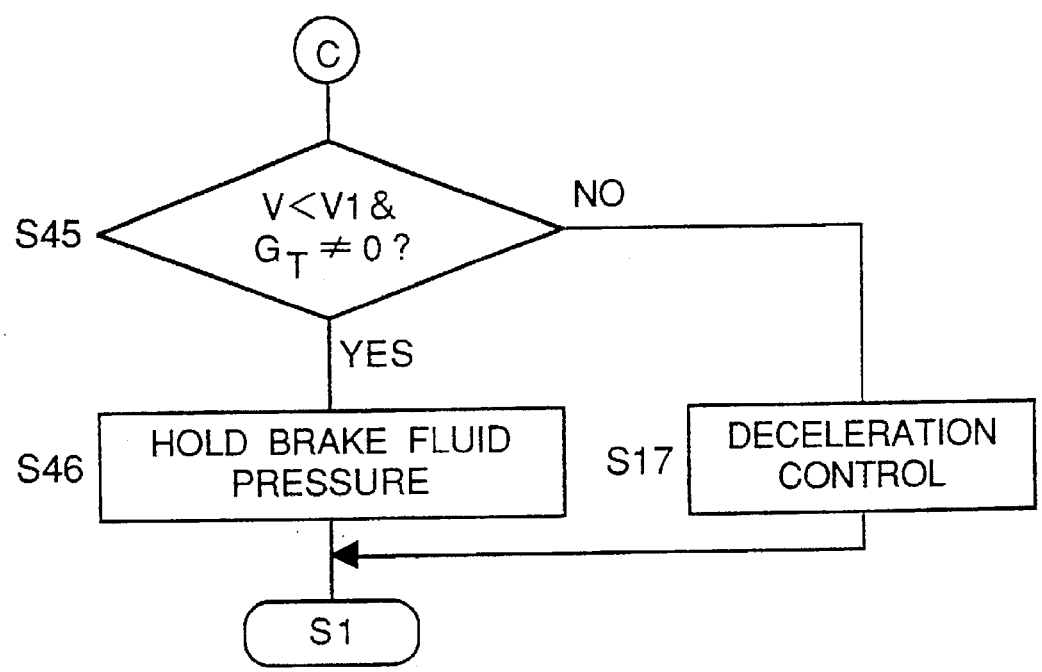
FIG. 7 is a flowchart showing a flow from step S7 of the flowchart of FIG. 3A.

Then, if it is found at step S7 in FIG. 3A that all the fluid pressure sensors 3a to 3n of the brake fluid pressure sensor 3 fail, namely, in the case of "YES" at step S7, processings shown in FIG. 7 are performed. In FIG. 7, steps identical with those of FIGS. 3A and 3B are designated by reference numerals identical with those of FIGS. 3A and 3B and are described briefly. In FIG. 7, if it is found at step S45 that not only the speed V of the vehicle is smaller than the predetermined value V1, in other words, the speed V of the vehicle is low but the target deceleration $G_T$ is not equal to 0, namely, in the case of "YES" at step S45, the program flow proceeds to step S46. The fourth arithmetic unit 9 causes the brake fluid pressure control device 5 to hold current brake fluid pressure at step S46 and then, the program flow returns to step S1. Meanwhile, if it is found at step S45 that either the speed V of the vehicle is not less than the predetermined value V1, in other words, the speed V of the vehicle is high or the target deceleration $G_T$ is 0, namely, in the case of "NO" at step S45, the program flow proceeds to step S17. Deceleration control is performed at step S17 and then, the program flow returns to step S1.

Figure 8:
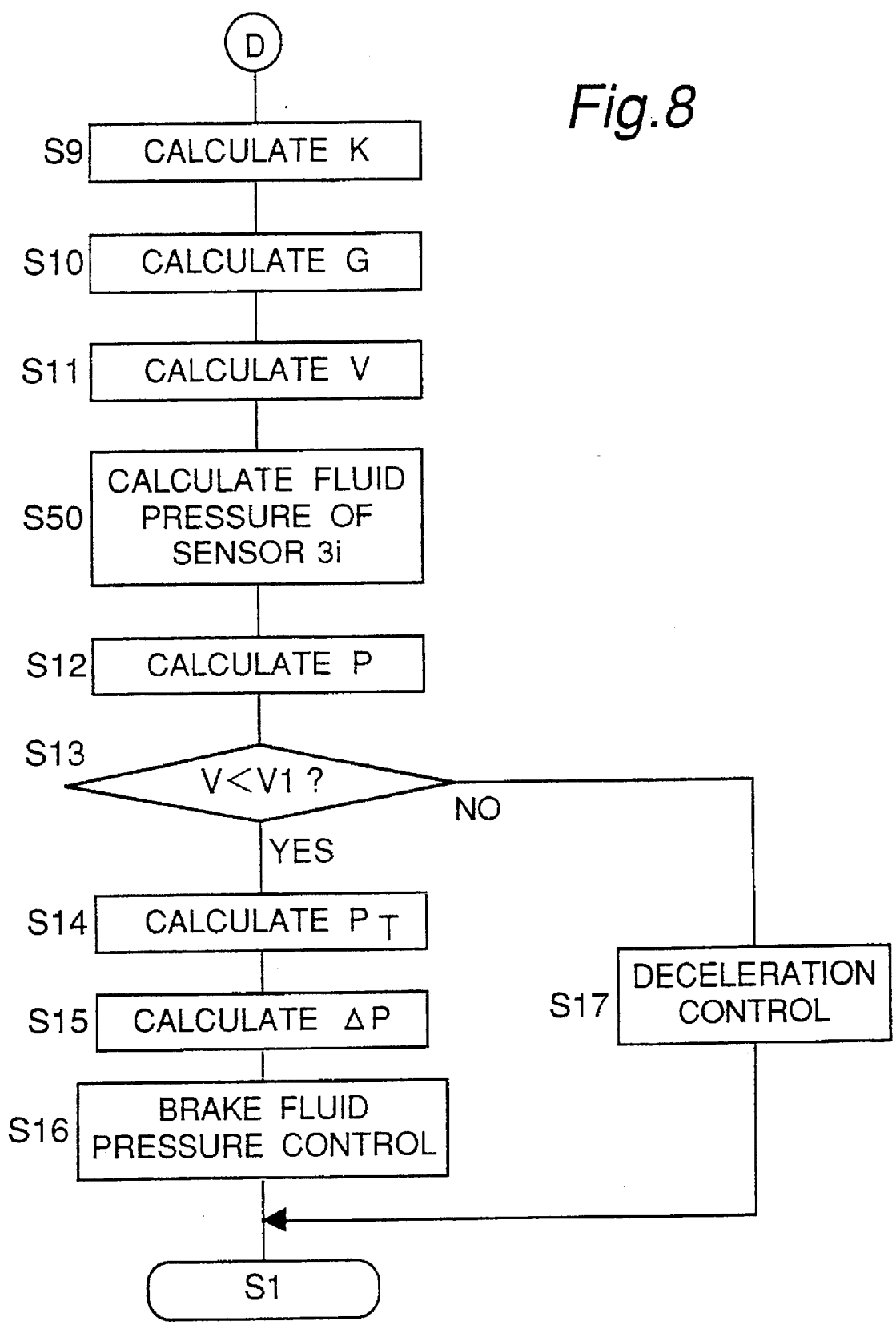
FIG. 8 is a flowchart showing a flow from step S8 of the flowchart of FIG. 3A.

Then, if it is found at step S8 in FIG. 3A that only an arbitrary fluid pressure sensor 3i of the brake fluid pressure sensor 3 fails, namely, in the case of "YES" at step S8, processings shown in FIG. 8 are performed. In FIG. 8, steps identical with those of FIGS. 3A and 3B are designated by reference numerals identical with those of FIGS. 3A and 3B and are described briefly by referring to only its differences from steps S9 or more in FIGS. 3A and 3B. In FIG. 8, step S50 is added between steps S11 and S12 of FIGS. 3A and 3B. At step S50, a fluid pressure value of a fluid pressure sensor 3i corresponding to that of one of the remaining fluid pressure sensors is calculated from characteristics indicative of predetermined relation between the fluid pressure sensor 3i and the remaining fluid pressure sensor. Then, at step S12, the actual brake fluid pressure P is calculated from the fluid pressure value of the fluid pressure sensor 3i and that of the remaining fluid pressure sensor.

Figure 10A:
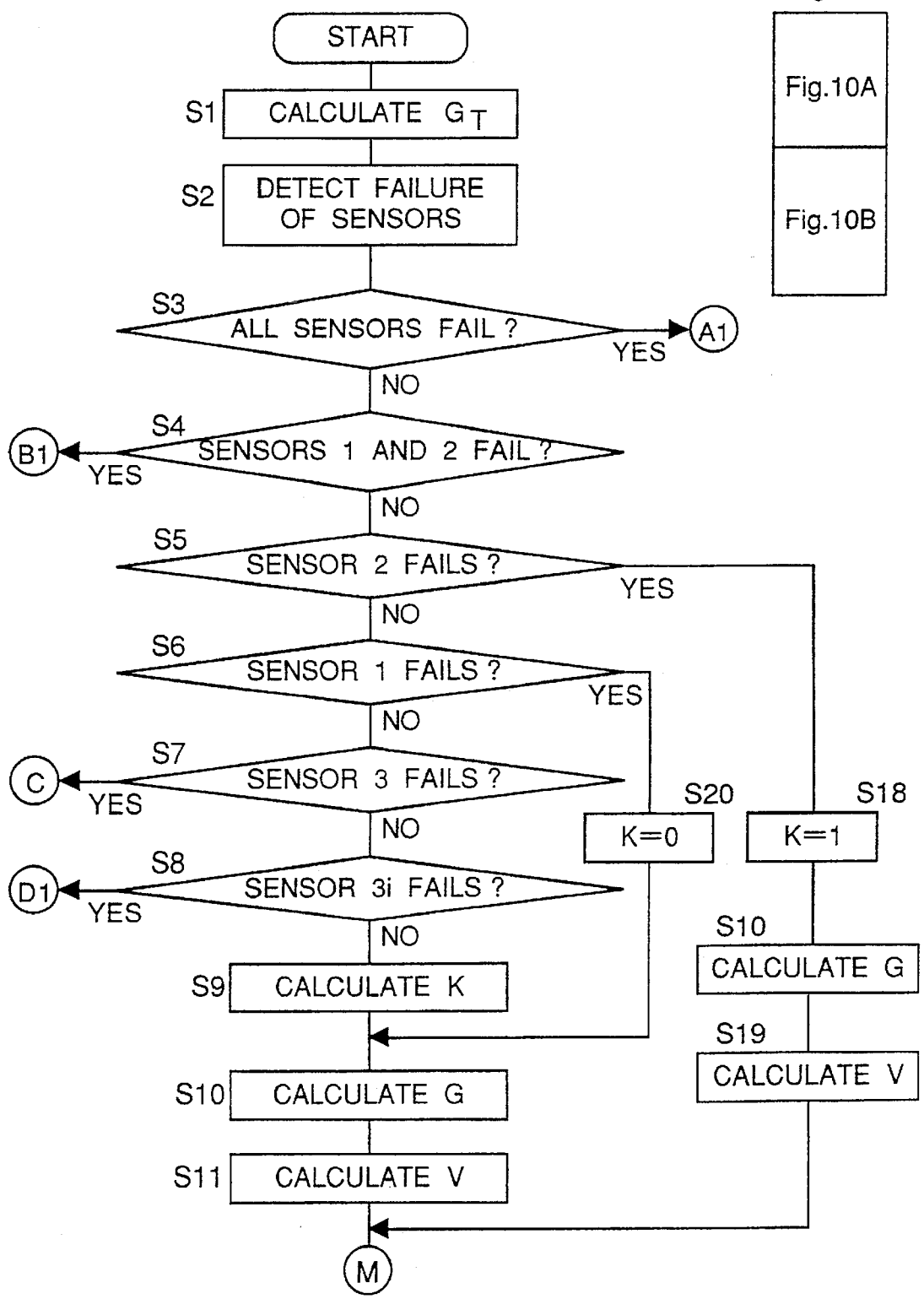
FIGS. 10A and 10B are flowcharts showing a second example of operation of the deceleration control device of FIG. 1.
Figure 10B:
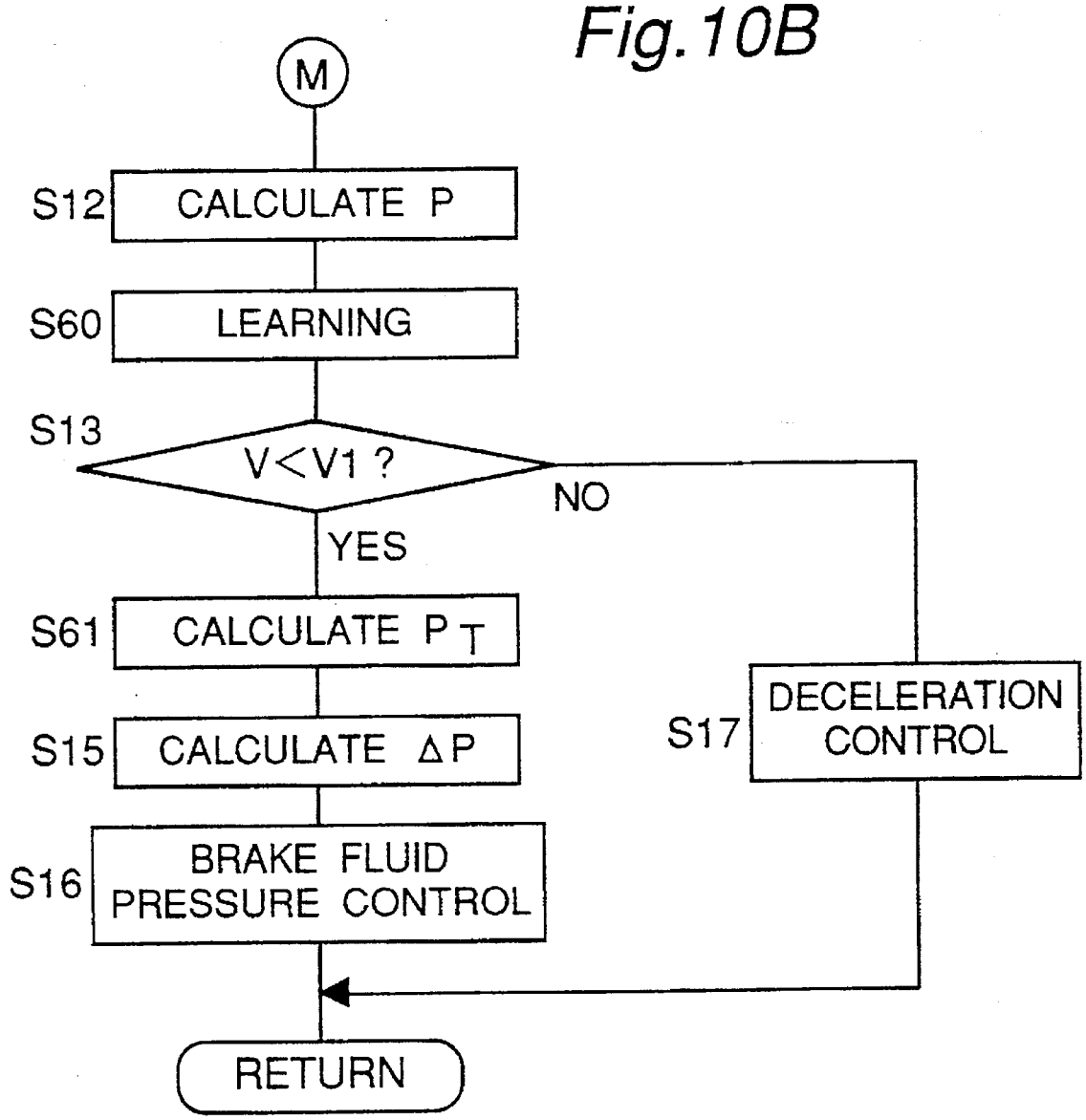
Figure 13:
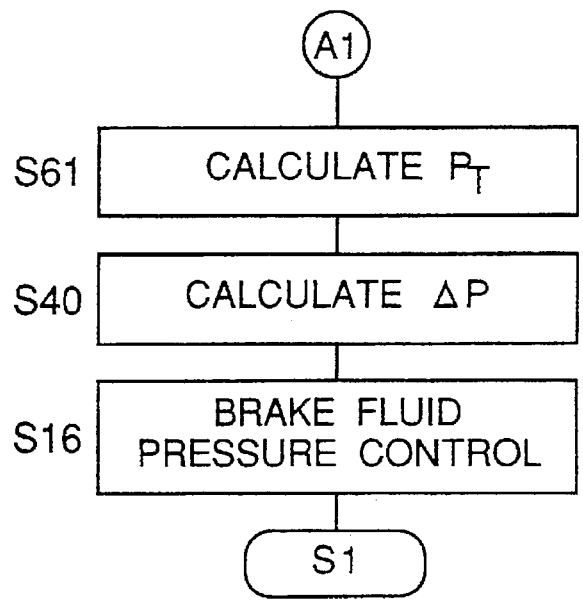
FIG. 13 is a flowchart showing a flow from step S3 of the flowchart of FIG. 10A.
Figure 14:
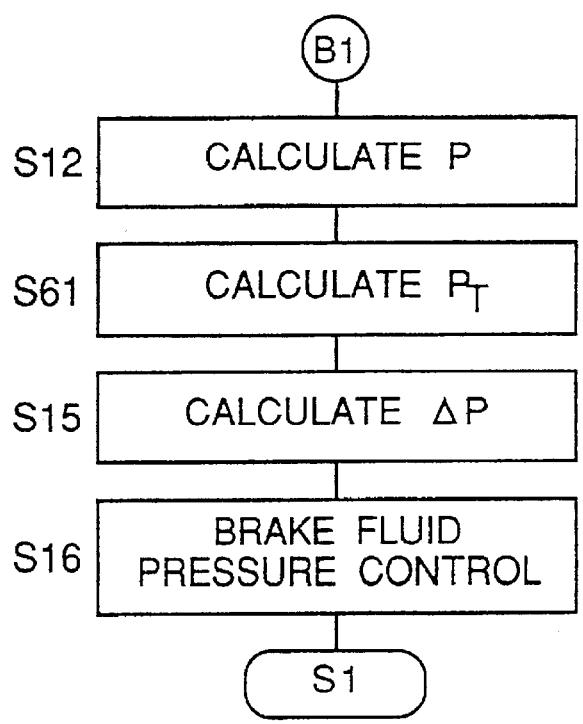
FIG. 14 is a flowchart showing a flow from step S4 of the flowchart of FIG. 10A.
Figure 15:
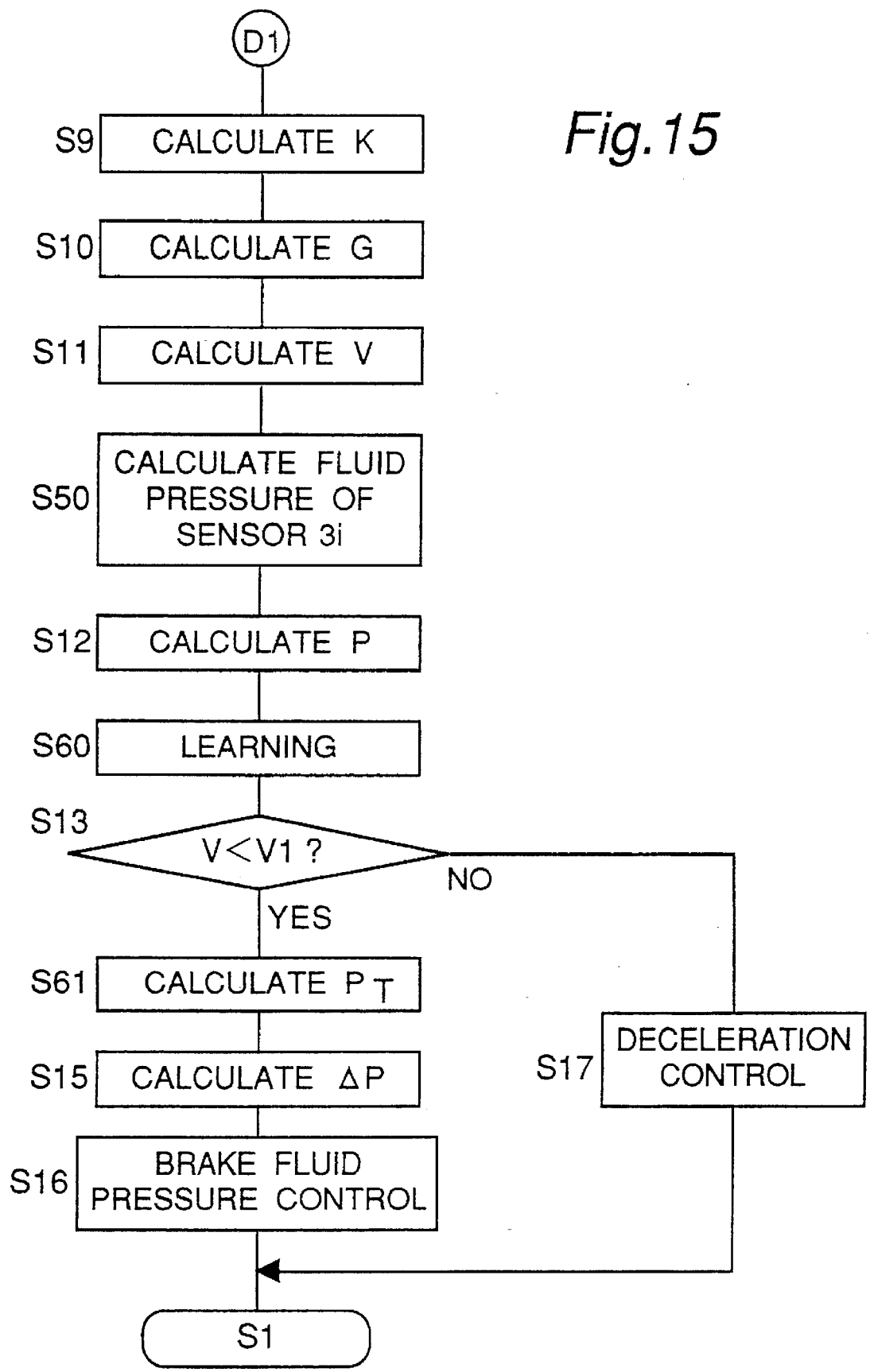
FIG. 15 is a flowchart showing a flow from step S8 of the flowchart of FIG. 10A.

Then, a second example of operation of the deceleration control device 4 applied to the deceleration control system of FIG. 2 is described with reference to flowcharts of FIGS. 10A to 15. In FIGS. 10A to 15, steps identical with those of FIGS. 3A and 3B are designated by reference numerals identical with those of FIGS. 3A and 3B and thus, only their differences from the first example of operation are described. FIGS. 10A and 10B are different from FIGS. 3A and 3B in that in FIGS. 10A and 10B, step S60 is added between steps S12 and S13 of FIG. 3B and step S14 of FIG. 3B is replaced with step S61. Furthermore, in FIG. 10A, if it is found at step S3 that all the sensors 1 to 3 fail, namely, in the case of "YES" at step S3, processings shown in FIG. 13 are performed. Moreover, if it is found at step S4 that all the sensors 1 and 2 fail, namely, in the case of "YES" at step S4, processings shown in FIG. 14 are performed. In addition, if it is found at step S8 that a fluid pressure sensor 3i of the brake fluid pressure sensor 3 fails, namely, in the case of "YES" at step S8, processings shown in FIG. 15 are performed.

Figure 11:
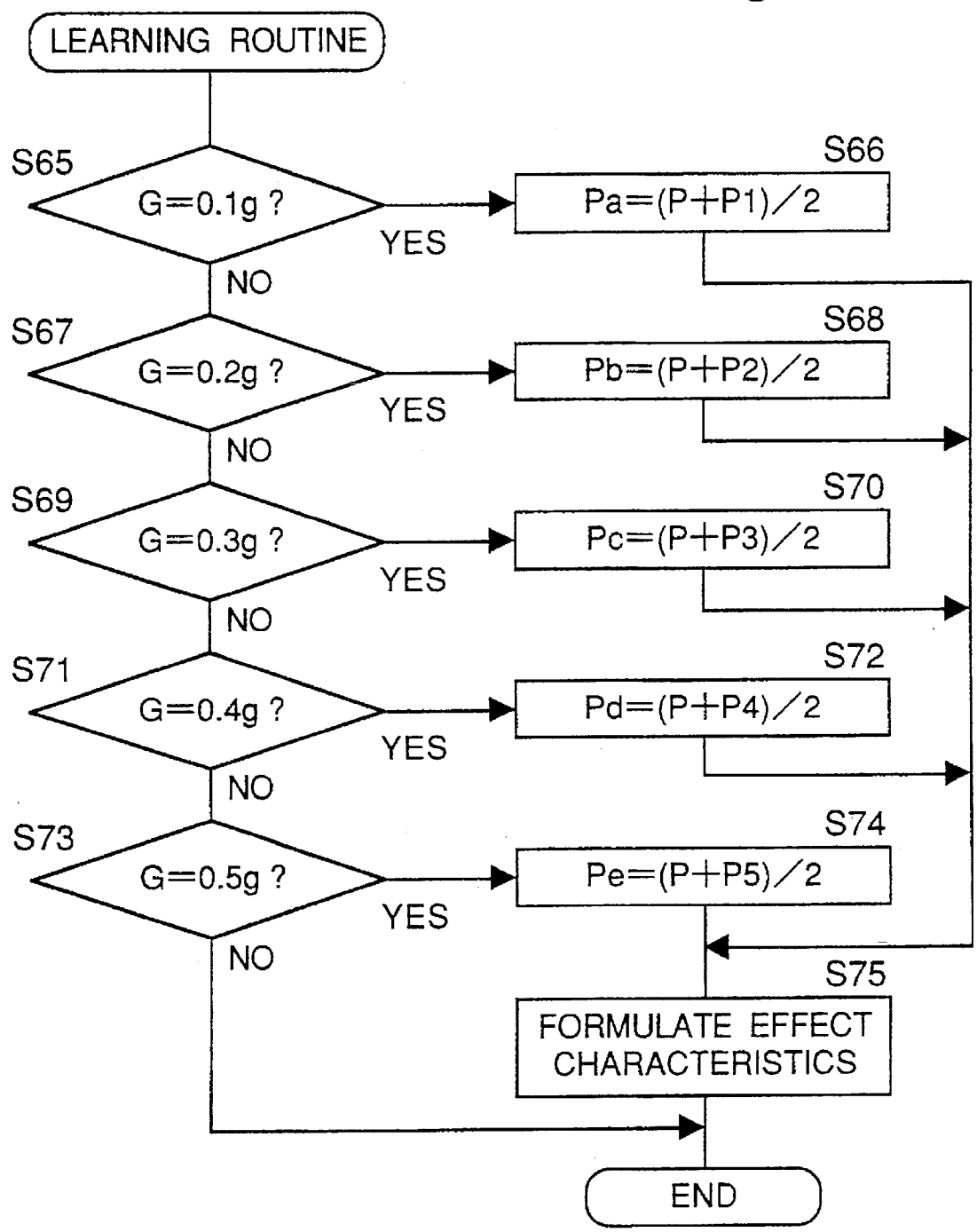
FIG. 11 is a flowchart showing one example of a routine for learning braking effectiveness of the vehicle at step S60 in the flowchart of FIG. 10B.
Figure 12B:
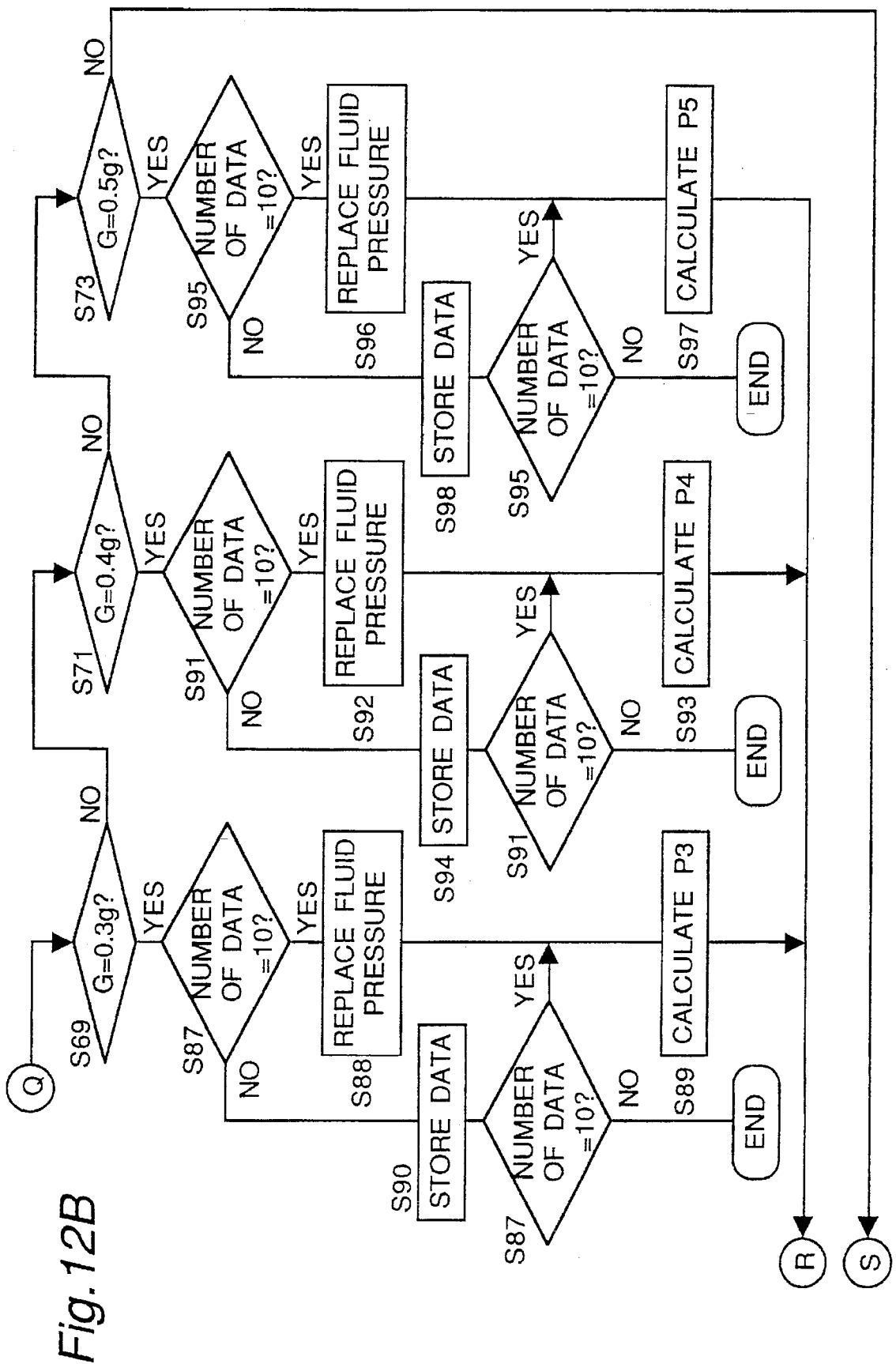

At step S60, a learning routine for learning braking effectiveness of the vehicle indicative of relation between the actual deceleration G and the actual brake fluid pressure P of the vehicle is performed at the time of braking by the fourth arithmetic unit 9 as shown in FIG. 11 or 12A and 12B. This step is performed because braking effectiveness of the vehicle vary according to change of weight of the vehicle due to change of its load such as the number of the passengers, change of coefficient of friction of brake pads due to temperatures of the brake pads, deterioration of the brake pads, etc.

In FIG. 11, if it is found at step S65 that the actual deceleration G calculated at the time of braking by the first arithmetic unit 6 is 0.1g (g=gravitational acceleration), namely, in the case of "YES" at step S65, the average value Pa of an actual brake fluid pressure P obtained at this time by the brake fluid pressure sensor 3 and a brake fluid pressure P1 obtained at a deceleration of 0.1g in the map of vehicular effectiveness of the vehicle formulated at the previous time is calculated by the fourth arithmetic unit 9 at step S66 and then, the program flow proceeds to step S75. At step S75, the fourth arithmetic unit 9 formulates braking effectiveness of the vehicle by correcting a map of the already formulated braking effectiveness of the vehicle through setting of this average value Pa to a brake fluid pressure obtained at a deceleration of 0.1g in the map of the vehicular effectiveness of the vehicle, thereby resulting in end of the program flow.

Meanwhile, if it is found at step S65 that the actual deceleration G calculated by the first arithmetic unit 6 is not 0.1g, namely, in the case of "NO" at step S65, the program flow proceeds to step S67. If it is found at step 67 that the actual deceleration G calculated at the time of braking by the first arithmetic unit 6 is 0.2g, namely, in the case of "YES"

at step S67, the average value Pb of an actual brake fluid pressure P obtained at this time by the brake fluid pressure sensor 3 and a brake fluid pressure P2 obtained at a deceleration of 0.2g in the map of vehicular effectiveness of the vehicle formulated at the previous time is calculated by the fourth arithmetic unit 9 at step S68 followed by step S75. At step S75, the fourth arithmetic unit 9 corrects a map of the vehicular effectiveness of the vehicle by setting this average value Pb to a brake fluid pressure obtained at a deceleration of 0.2g, thereby resulting in end of the program flow.

On the other hand, if it is found at step S67 that the actual deceleration G calculated by the first arithmetic unit 6 is not 0.2g, namely, in the case of "NO" at step S67, the program flow proceeds to step S69. When it is found at step S69 that the actual deceleration G calculated by the first arithmetic unit 6 during braking is 0.3g, namely, in the case of "YES" at step S69, an average value Pc of the actual brake fluid pressure P obtained at this time by the brake fluid pressure sensor 3 and a brake fluid pressure P3 obtained at a deceleration of 0.3g in the braking effectiveness of the vehicle formulated at the previous time is calculated by the fourth arithmetic unit 9 at step S70 followed by step S75. At step S75, the fourth arithmetic unit 9 corrects a map of the vehicular effectiveness of the vehicle setting this average value Pc to a brake fluid pressure obtained at a deceleration of 0.3g, thereby resulting in end of the program flow.

Meanwhile, if it is found at step S69 that the actual deceleration G calculated by the first arithmetic unit 6 is not 0.3g, namely, in the case of "NO" at step S69, the program flow proceeds to step S71. If it is found at step S71 that the actual deceleration G calculated by the first arithmetic unit 6 during braking is 0.4g, namely, in the case of "YES" at step S71, an average value Pd of the actual brake fluid pressure P obtained at this time by the brake fluid pressure sensor 3 and a brake fluid pressure P4 obtained at a deceleration of 0.4g in the braking effectiveness of the vehicle formulated at the previous time is calculated by the fourth arithmetic unit 9 at step 72 followed by step S75. At step S75, the fourth arithmetic unit 9 corrects a map of the already formulated braking effectiveness of the vehicle setting this average value Pd to a brake fluid pressure obtained at a deceleration of 0.4g, thereby resulting in end of the program flow.

On the other hand, if it is found at step S71 that the actual deceleration G calculated by the first arithmetic unit 6 is not 0.4g, namely, in the case of "NO" at step S71, the program flow proceeds to step S73. If it is found at step S73 that the actual deceleration G calculated at the time of braking by the first arithmetic unit 6 is 0.5g, namely, in the case of "YES" at step S73, an average value Pe of the actual brake fluid pressure P obtained at this time by the brake fluid pressure sensor 3 and a brake fluid pressure P5 obtained at a deceleration of 0.5g in the braking effectiveness of the vehicle formulated at the previous time is calculated by the fourth arithmetic unit 9 at step S74 followed by step S75. At step S75, the fourth arithmetic unit 9 corrects a map of the already formulated braking effectiveness of the vehicle setting this average value Pe to a brake fluid pressure obtained at a deceleration of 0.5g, thereby resulting in end of the program flow.

Meanwhile, if it is found at step S73 that the actual deceleration G calculated by the first arithmetic unit 6 is not 0.5g, namely, in the case of "NO" at step S73, the program flow ends.

Then, another example of the learning routine for braking effectiveness of the vehicle indicative of relation between the actual deceleration G and the actual brake fluid pressure P is described with reference to the flowchart of FIGS. 12A and 12B. In FIGS. 12A and 12B, steps identical with those of FIG. 11 are designated by reference numerals identical with those of FIG. 11. In FIGS. 12A and 12B, if it found at step S65 that the actual deceleration G calculated at the time of braking by the first arithmetic unit 6 is 0.1g, namely, in the case of "YES" at step S65, the fourth arithmetic unit 9 inspects whether or not data on the brake fluid pressure obtained at the actual deceleration G of 0.1g, which has been stored so far at the time of braking, reach 10 in number at step S78. In the case of "YES" at step S78, the program flow proceeds step S79. At step S79, the fourth arithmetic unit 9 replaces the oldest one of the data on the brake fluid pressure stored at the actual deceleration G of 0.1g with the brake fluid pressure obtained at the actual deceleration G of 0.1g at this time.

Subsequently, the program flow proceeds to step S80. The fourth arithmetic unit 9 calculates an average value P1 of the brake fluid pressures stored at the actual deceleration of 0.1g at step S80 and then, the program flow proceeds to step S81. At step S81, the fourth arithmetic unit 9 corrects a map of the braking effectiveness of the vehicle setting this average value P1 to a brake fluid pressure obtained at the actual deceleration G of 0.1g, thus resulting in end of the program flow.

Meanwhile, if it is found at step S78 that the number of the data on the brake fluid pressure obtained at the actual deceleration G of 0.1g is smaller than 10, namely, in the case of "NO" at step S78, the program flow proceeds to step S82. At step S82, the fourth arithmetic unit 9 stores the brake fluid pressure obtained at the actual deceleration of 0.1g at this time and then, a processing of step S78 is performed again. If it is found at step S78 by the fourth arithmetic unit 9 that the number of the data on the brake fluid pressure obtained at the actual deceleration G of 0.1g reaches 10, namely, in the case of "YES" at step S78, the program flow proceeds to step S80. On the other hand, in the case of "NO" at step S78, the program flow ends.

If it is found at step S65 that the actual deceleration G calculated at the time of braking by the first arithmetic unit 6 is not 0.1g, namely, in the case of "NO" at step S65, the program flow proceeds to step S67. If it is found at step S67 that the actual deceleration G calculated at the time of braking by the first arithmetic unit 6 is 0.2g, namely, in the case of "YES" at step S67, the program flow proceeds to step S83. At step S83, the fourth arithmetic unit 9 inspects whether or not data on the brake fluid pressure obtained at the actual deceleration G of 0.2g, which has been stored so far at the time of braking, reaches 10 in number. In the case of "YES" at step S83, the program flow proceeds to step S84. At step S84, the fourth arithmetic unit 9 replaces the oldest one of the data on the brake fluid pressure stored at the actual deceleration G of 0.2g with the brake fluid pressure obtained at the actual deceleration G of 0.2g at this time.

Subsequently, the program flow proceeds to step S85. The fourth arithmetic unit 9 calculates an average value P2 of the brake fluid pressures stored at the actual deceleration G of 0.2g at step S85 and then, the program flow proceeds to step S81. At step S81, the fourth arithmetic unit 9 corrects a map of the braking effectiveness of the vehicle setting this average value P2 to a brake fluid pressure obtained at the actual deceleration G of 0.2g, thereby resulting in end of the program flow.

If it is found at step S83 that the number of the data on the brake fluid pressure stored at the actual deceleration G of 0.2g is smaller than 10, namely, in the case of "NO" at step S83, the program flow proceeds to step S86. At step S86, the fourth arithmetic unit 9 stores the brake fluid pressure stored at the actual deceleration G of 0.2g at this time and then, a processing of step 83 is performed again. If it is found at step S83 by the fourth arithmetic unit 9 that the number of the data on the brake fluid pressure obtained at the actual deceleration G of 0.2g reaches 10, namely, in the case of "YES" at step S83, the program flow proceeds to step S85. On the other hand, if it is found at step S83 that the number of the data on the brake fluid pressure obtained at the actual deceleration G of 0.2g is smaller than 10, the program flow ends.

Meanwhile, if it is found at step S67 that the actual deceleration G calculated at the time of braking by the first arithmetic unit 6 is not 0.2g, namely, in the case of "NO" at step S67, the program flow proceeds to step S69. If it is found at step S69 that the actual deceleration G calculated by the first arithmetic unit 6 is 0.3g, namely, in the case of "YES" at step S69, the program flow proceeds to step S87. At step S87, the fourth arithmetic unit 9 inspects whether or not data on the brake fluid pressure obtained at the actual deceleration G of 0.3g, which has been stored so far at the time of braking, reaches 10 in number. In the case of "YES" at step S87, the program flow proceeds to step S88. At step S88, the fourth arithmetic unit 9 replaces the oldest one of the data on the brake fluid pressure stored at the actual deceleration G of 0.3g with the brake fluid pressure obtained at the actual deceleration G of 0.3g at this time.

Thereafter, the program flow proceeds to step S89. The fourth arithmetic unit 9 calculates an average value P3 of the brake fluid pressures stored at the actual deceleration G of 0.3g at step S89 and then, the program flow proceeds to step S81. At step S81, the fourth arithmetic unit 9 corrects the braking effectiveness of the vehicle setting this average value P3 to a brake fluid pressure obtained at the actual deceleration G of 0.3g, thereby resulting in end of the program flow.

If it is found at step S87 that the number of the data on the brake fluid pressure stored at the actual deceleration G of 0.3g is smaller than 10, namely, in the case of "NO" at step S87, the program flow proceeds to step S90. At step S90, the fourth arithmetic unit 9 stores the brake fluid pressure obtained at the actual deceleration G of 0.3g at this time and then, a processing of step S87 is performed again. If it is found at step S87 by the fourth arithmetic unit 9 that the number of the data on the brake fluid pressure stored at the actual deceleration G of 0.3g reaches 10, namely, in the case of "YES" at step S87, the program flow proceeds to step S89. On the other hand, if it is found at step S87 that the number of the data on the brake fluid pressure stored at the actual deceleration G of 0.3g is smaller than 10, namely, in the case of "NO" at step S87, the program flow ends.

Meanwhile, if it is found at step S69 that the actual deceleration G calculated at the time of braking by the first arithmetic unit 6 is not 0.3g, namely, in the case of "NO" at step S69, the program flow proceeds to step S71. If it is found at step S71 that the actual deceleration G calculated by the first arithmetic unit 6 is 0.4g, namely, in the case of "YES" at step S71, the program flow proceeds to step S91. At step S91, the fourth arithmetic unit 9 inspects whether or not data on the brake fluid pressure obtained at the actual deceleration G of 0.4g, which has been stored so far at the time of braking, reach 10 in number. In the case of "YES" at step S91, the program flow proceeds to step S92. At step S92, the fourth arithmetic unit 9 replaces the oldest one of the data on the brake fluid pressure stored at the actual deceleration G of 0.4g with the brake fluid pressure obtained at the actual deceleration of 0.4g at this time.

Subsequently, the program flow proceeds to step S93. The fourth arithmetic unit 9 calculates an average value P4 of the brake fluid pressures stored at the actual deceleration G of 0.4g at step S93 and then, the program flow proceeds to step S81. At step S81, the fourth arithmetic unit 9 corrects a map of the braking effectiveness of the vehicle setting this average value P4 to a brake fluid pressure obtained at the actual deceleration G of 0.4g, thereby resulting in end of the program flow.

Meanwhile, if it is found at step S91 that the number of the data on the brake fluid pressure stored at the actual deceleration G of 0.4g is smaller than 10, namely, in the case of "NO" at step S91, the program flow proceeds to step S94. At step S94, the fourth arithmetic unit 9 stores the brake fluid pressure obtained at the actual deceleration G of 0.4g at this time and then, a processing of step S91 is performed again. If it is found at step S91 by the fourth arithmetic unit 9 that the number of the data on the brake fluid pressure stored at the actual deceleration G of 0.4g reach 10, the program flow proceeds to step S93. On the contrary, if it is found at step S91 that the number of the data on the brake fluid pressure stored at the actual deceleration G of 0.4g is smaller than 10, namely, in the case of "NO" at step S91, the program flow ends.

Meanwhile, if it is found at step S71 that the actual deceleration G calculated at the time of braking by the first arithmetic unit 6 is not 0.4g, namely, at the time of "NO" at step S71, the program flow proceeds to step S73. If it is found at step S73 that the actual deceleration G calculated by the first arithmetic unit 6 is 0.5g, namely, in the case of "YES" at step S73, the program flow proceeds to step S95. At step S95, the fourth arithmetic unit 9 inspects whether or not data on the brake fluid pressure obtained at the actual deceleration G of 0.5g, which has been stored so far at the time of braking, reaches 10 in number. In the case of "YES" at step S95, the program flow proceeds to step S96. At step S96, the fourth arithmetic unit 9 replaces the oldest one of the data on the brake fluid pressure stored at the actual deceleration G of 0.5g with the brake fluid pressure obtained at the actual deceleration G of 0.5g at this time.

Subsequently, the program flow proceeds to step S97. The fourth arithmetic unit 9 calculates an average value of the brake fluid pressures stored at the actual deceleration G of 0.5g at step S97 and then, the program flow proceeds to step S81. At step S81, the fourth arithmetic unit 9 corrects a map of the braking effectiveness of the vehicle setting this average value P5 to a brake fluid pressure at the actual deceleration G of 0.5g, thus resulting in end of the program flow.

Meanwhile, if it is found at step S95 that the number of the data on the brake fluid pressure stored at the actual deceleration G of 0.5g is smaller than 10, namely, in the case of "NO" at step S95, the program flow proceeds to step S98. At step S98, the fourth arithmetic unit 9 stores the brake fluid pressure obtained at the actual deceleration G of 0.5g at this time and then, a processing of step S95 is performed again. If it is found at step S95 by the fourth arithmetic unit 9 that the number of the data on the brake fluid pressure stored at the actual deceleration G of 0.5g reaches 10, the program flow proceeds to step S97. On the other hand, if it is found at step S95 that the number of the data on the brake fluid pressure stored at the actual deceleration G of 0.5g is smaller than 10, namely, in the case of "NO" at step S95, the program flow ends.

Meanwhile, in case the previous braking effectiveness of the vehicle or the learned braking effectiveness of the vehicle are not yet formulated when processings of the flowcharts of FIGS. 11 and 12A and 12B are performed, predetermined braking effectiveness of the vehicle are utilized.

Furthermore, in FIGS. 11 and 12A and 12B, the brake fluid pressure is calculated at an interval of 0.1g for the actual deceleration G of 0.1g to 0.5g and in FIGS. 12A and 12B, an average value of the 10 brake fluid pressures is calculated for one value of the actual deceleration G. However, these are merely one example and the deceleration control device of the present invention is not restricted to this example. Thus, it is needless to say that a desired number of the brake fluid pressures may be calculated for a desired value of the actual deceleration G.

Meanwhile, in formulation of the braking effectiveness of the vehicle at step S75 in FIG. 11 and at step S81 in FIG. 12A, a functional equation for braking effectiveness of the vehicle preset by method of least squares, etc. may also be formulated without formulating the map.

After new braking effectiveness of the vehicle have been formulated by learning at step S60 in FIG. 10B, the program flow proceeds to step S13. In FIG. 10B, if it is found at step S13 that the speed V of the vehicle calculated by the second arithmetic unit 7 is smaller than the predetermined value V1, namely, the speed V of the vehicle is low, the program flow proceeds to step S61. At step S61, the target brake fluid pressure $P_T$ corresponding to the target deceleration $G_T$ is calculated by the fourth arithmetic unit 9 from the new braking effectiveness of the vehicle formulated by the learning routine of the braking effectiveness of the vehicle shown in FIG. 11 and then, the program flow proceeds to step S15.

Furthermore, in FIG. 10A, if it is found at step S3 that all the sensors 1 to 3 fail, namely, in the case of "YES" at step S3, processings shown in FIG. 13 are performed. Meanwhile, in FIG. 13, steps identical with those of FIG. 5 are designated by reference numerals identical with those of FIG. 5 and only its differences from FIG. 5 are described here. FIG. 13 is different from FIG. 5 only in that in FIG. 13, step S13 of FIG. 5 is replaced with step S61 of FIG. 10B.

Then, in FIG. 10A, if it is found at step S4 that the all the sensors 1 and 2 fail, namely, in the case of "YES" at step S4, namely, in the case of "YES" at step S4, processings shown in FIG. 14 are performed. Meanwhile, in FIG. 14, steps identical with those of FIG. 6 are designated by reference numerals identical with those of FIG. 6 and only its difference from FIG. 6 are described here. FIG. 14 is different from FIG. 6 only in that in FIG. 14, step S14 of FIG. 6 is replaced with step S61 of FIG. 10B.

Subsequently, in FIG. 10A, if it is found at step S8 that an arbitrary fluid pressure sensor $3i$ of the brake fluid pressure sensor 3 fails, namely, in the case of "YES" at step S8, processings shown in FIG. 15 are performed. In FIG. 15, steps identical with those of FIG. 8 are designated by reference numerals identical with those of FIG. 8 and its differences from FIG. 8 are described here. FIG. 15 is different from FIG. 8 only in that in FIG. 15, step S60 of FIG. 10B is added between steps S12 and S13 of FIG. 8 and step S14 of FIG. 8 is replaced with step S61 of FIG. 10B.

Figure 16:
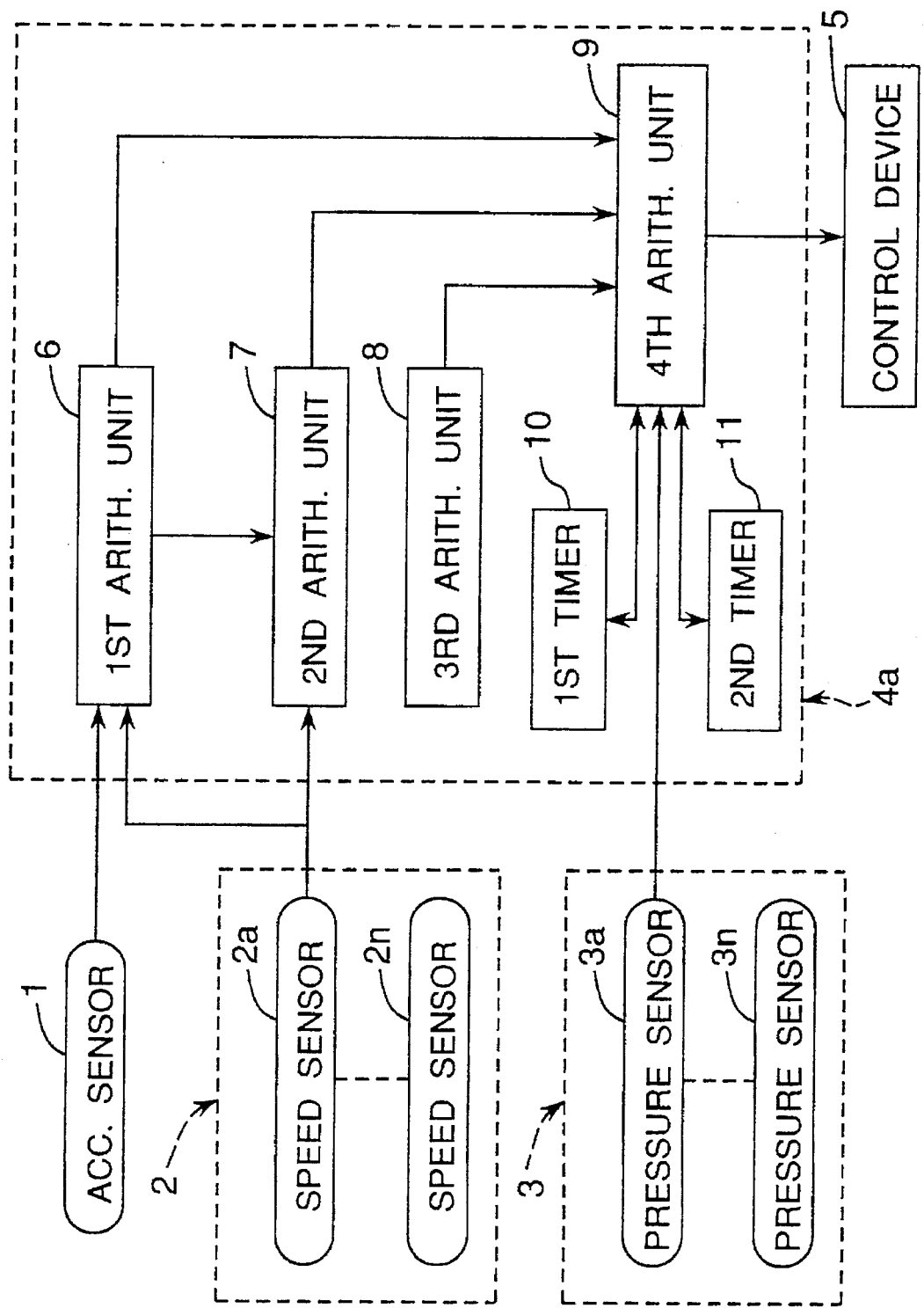
FIG. 16 is a schematic block diagram of a deceleration control device according to a second embodiment of the present invention.

FIG. 16 shows a deceleration control device $4a$ according to a second embodiment of the present invention. In comparison with the deceleration control device 4 of the first embodiment of FIG. 1, the deceleration control device $4a$ additionally includes first and second timers 10 and 11 having first and second counters T1 and T2, respectively. The first and second timers T1 and T2 are connected to the fourth arithmetic unit 9 so as to be controlled by the fourth arithmetic unit 9. The first timer 11 is used for inspecting whether or not the target deceleration $G_T$ falls within a predetermined range for a predetermined period, while the second timer 12 is used for inspecting whether or not the actual deceleration G is sufficiently approximate to the target deceleration $G_T$.

Figure 17:
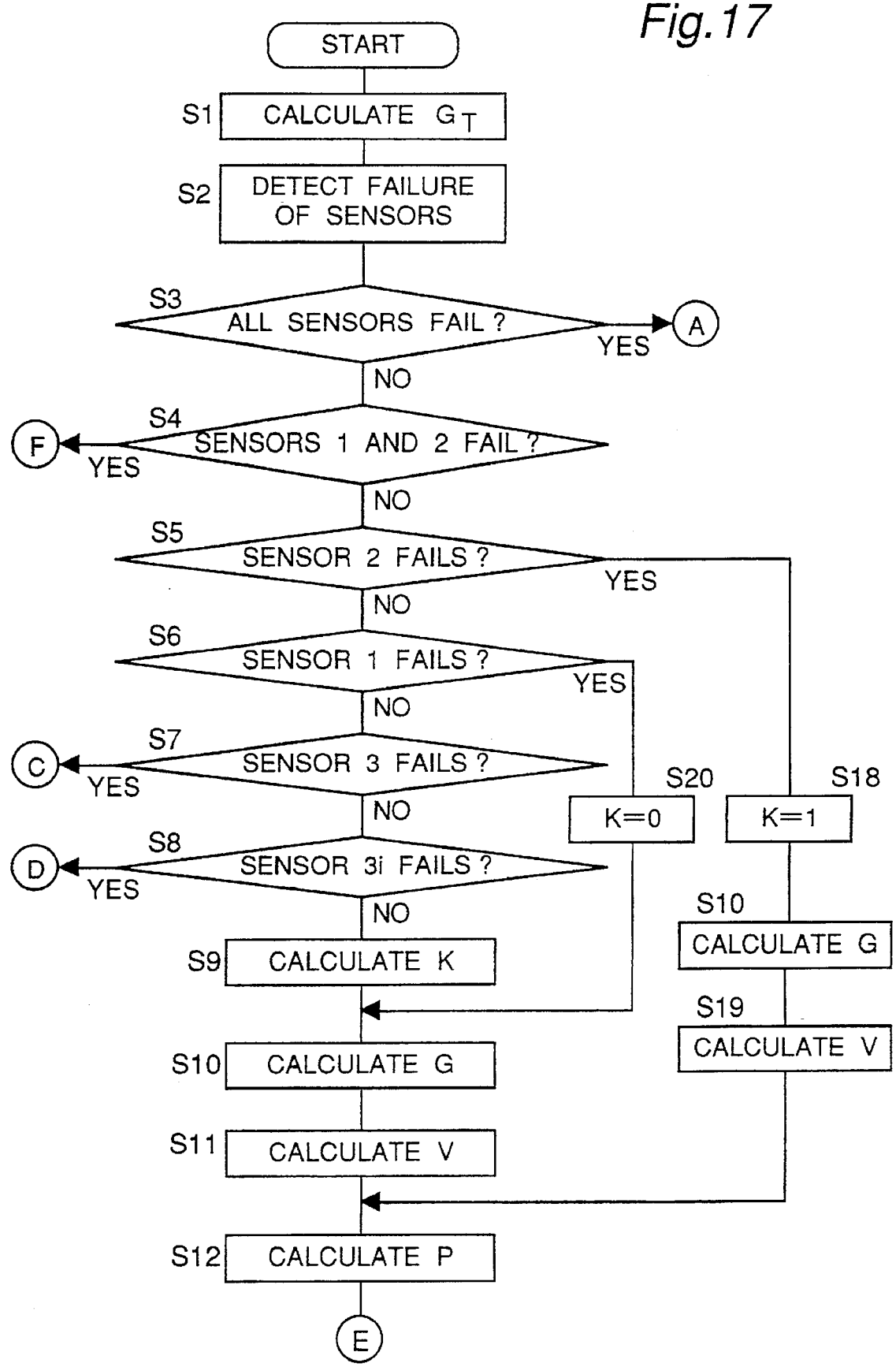
FIG. 17 is a flowchart showing a first half portion of a first example of operation of the deceleration control device of FIG. 16.
Figure 18:
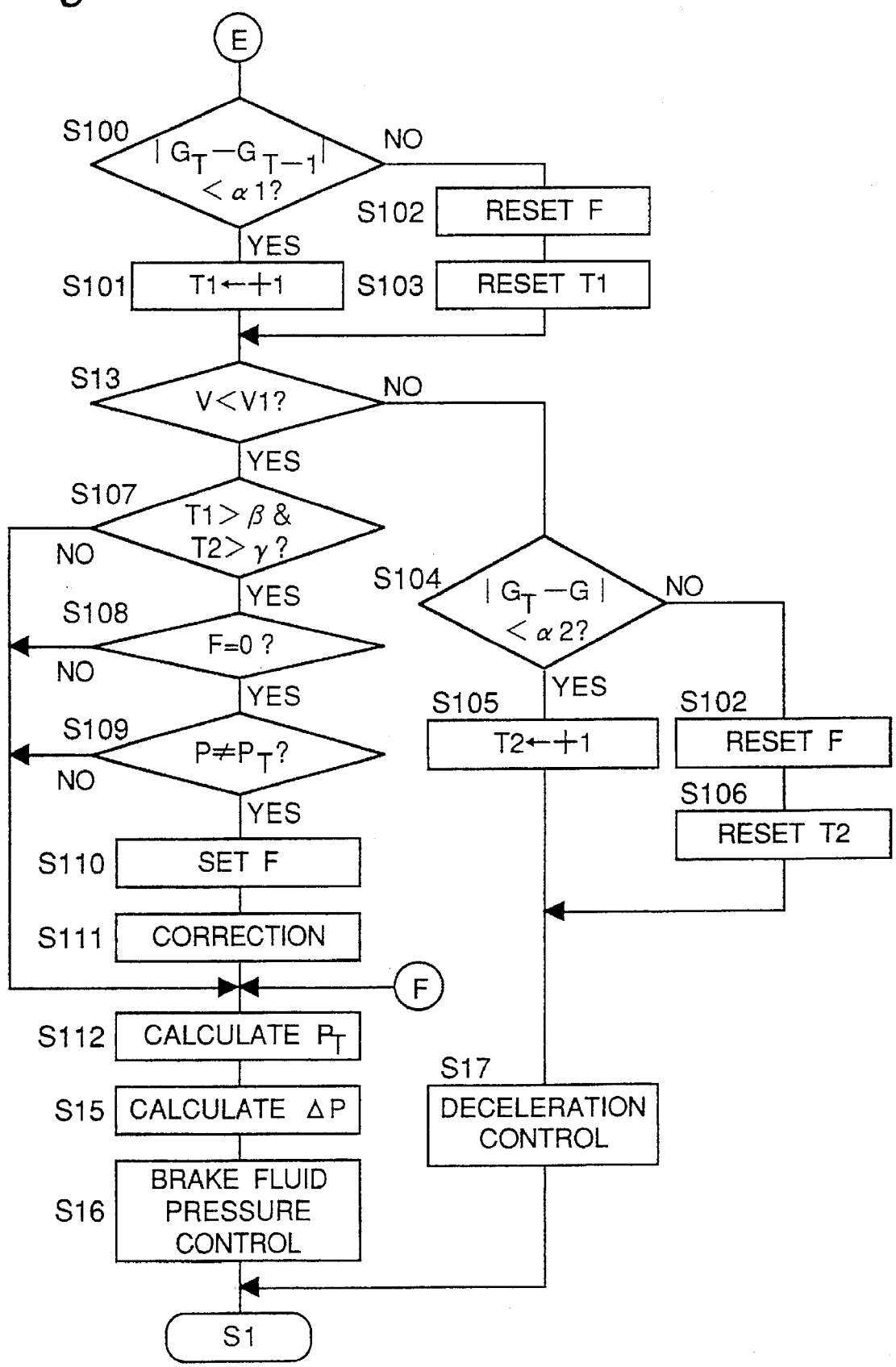
FIG. 18 is a flowchart showing a second half portion of the first example of operation of the deceleration control device of FIG. 16.

A first example of operation of the deceleration control device $4a$ is described with reference to flowcharts of FIGS. 17 and 18. In FIGS. 17 and 18, steps identical with those of FIGS. 3A to 8 indicative of the first example of operation of the deceleration control device 4 of the first embodiment are designated by reference numerals identical with those of FIGS. 3A to 8 and their differences from FIGS. 3A to 8 are described here. FIGS. 17 and 18 are different from FIGS. 3A and 3B in that in FIGS. 17 and 18, steps S100 to S103 are added between steps S12 and S13 of FIG. 3B, step S14 of FIG. 3B is replaced with steps S107 to S112 and steps S102 and S104 to S106 are added between steps S13 and S17 of FIG. 3B. Furthermore, FIGS. 17 and 18 are different from FIGS. 3A and 3B in that if it is found at step S4 of FIG. 17 that all the sensors 1 and 2 fail, namely, in the case of "YES" at step S4, the program flow proceeds to step S112 of FIG. 18.

In FIG. 17, after a processing of step S12 has been performed, the program flow proceeds to step S100 of FIG. 18. If it is found at step S100 that an absolute value of a difference between a target deceleration $G_T$ of this time and a target deceleration $G_{T-1}$ of the previous time is smaller than a predetermined value $\alpha1$, namely, in the case of "YES" at step S100, the program flow proceeds to step S101. One is added to a count of the counter T1 of the first timer 10 at step S101 and then, the program flow proceeds to step S13. On the other hand, in the case of "NO" at step S100, the program flow proceeds to step S102. Meanwhile, in FIG. 18, all processings of steps S100 or more are performed by the fourth arithmetic unit 9.

At step S102, a flag F in the fourth arithmetic unit 9, which indicates that the braking effectiveness of the vehicle have been corrected, is reset and then, the program flow proceeds to step S103. The counter T1 of the first timer 10 is reset at step 103 and then, the program flow proceeds to step S13. If it is found at step S13 that the speed V of the vehicle inputted from the second arithmetic unit 7 to the fourth arithmetic unit 9 is smaller than the predetermined value V1, namely, in the case of "YES" at step S13, the program flow proceeds to step S107. If it is found at step S107 that not only the count of the first counter T1 of the first timer 10 exceeds a predetermined value β but a count of the second counter T2 of the second timer 11 exceeds a predetermined value γ, namely, if it is judged at step S107 that the target deceleration $G_T$ is constant because scatter of the target deceleration $G_T$ is smaller than the predetermined value $\alpha1$ for over the predetermined period β and that the actual deceleration G is sufficiently approximate to the target deceleration $G_T$ because a difference between the target deceleration $G_T$ and the actual deceleration G is smaller than a predetermined value $\alpha2$ for over the predetermined period γ, the program flow proceeds to step S108.

If it is found at step S108 that the above mentioned flag F is reset, the program flow proceeds to step S109. If it is found at step S109 that the actual brake fluid pressure P is different from the target brake fluid pressure $P_T$ calculated in correspondence with the target deceleration $G_T$ from the braking effectiveness of the vehicle, namely, in the case of "YES" at step S109, the program flow proceeds to step S110. After the flag F has been reset at step S110, the braking effectiveness of the vehicle are corrected by drifting the difference between the target brake fluid pressure $P_T$ and the actual brake fluid pressure P at step S111 and then, the program flow proceeds to step S112. After the target brake fluid pressure $P_T$ has been calculated from the corrected braking effectiveness of the vehicle at step S112, the program flow proceeds to step S15.

On the other hand, if it is found at step S107 that either the count of the first counter T1 of the first timer 10 is not more than the predetermined value β or the count of the second counter T2 of the second timer 11 is not more than the predetermined value γ, namely, in the case of "NO" at step S107, the program flow proceeds to step S112. Likewise, if it is found at step S108 that the flag F has been already set, namely, in the case of "NO" at step S108 and if it is found at step S109 that the actual brake fluid pressure P is equal to the target brake fluid pressure $P_T$ calculated in correspondence with the target deceleration $G_T$ from the braking effectiveness of the vehicle, namely, in the case of "NO" at step S109, the program flow also proceeds to step S112. In case the braking effectiveness of the vehicle have not yet been corrected when the program flow proceeds to step S112, the predetermined braking effectiveness of the vehicle are utilized.

Meanwhile, if it is found at step S13 that the speed V of the vehicle inputted from the second arithmetic unit 7 to the fourth arithmetic unit 9 is not less than the predetermined value V1, namely, in the case of "NO" at step S13, the program flow proceeds to step S104. If it is found at step S104 that an absolute value of the difference between the target deceleration $G_T$ and the actual deceleration G is smaller than the predetermined value α2, namely, in the case of "YES" at step S104, the program flow proceeds to step S105. After one has been added to the count of the second counter T2 of the second timer 11 at step S105, the program flow proceeds to step S17.

If it is found at step S104 that the absolute value of the difference between the target deceleration $G_T$ and the actual deceleration G is not less than the predetermined value α2, namely, in the case of "NO" at step S104, the program flow proceeds to step S102. The flag F is reset at step S102 and then, the program flow proceeds to step S106. The second counter T2 of the second timer 11 is reset at step S106 and then, the program flow proceeds to step S17.

As described above, the flag F is provided for correcting the braking effectiveness of the vehicle only at an initial time when all the conditions (1) the speed V of the vehicle is smaller than the predetermined value V1, (2) the count of the first counter T1 of the first timer 10 exceeds the predetermined value β and (3) the count of the second counter T2 of the second timer 11 exceeds the predetermined value γ are satisfied.

Figure 19:
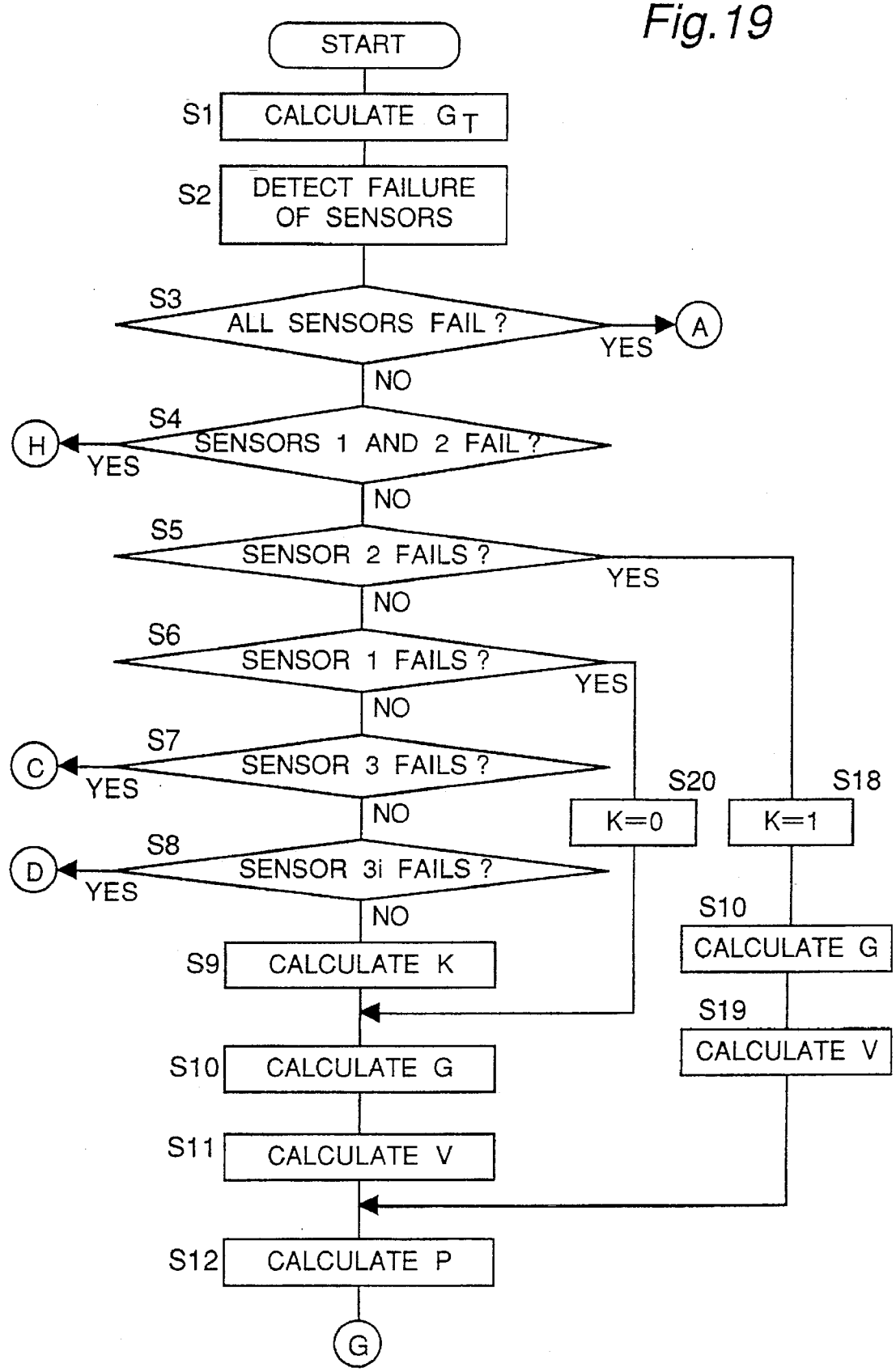
FIG. 19 is a flowchart showing a first half portion of a second example of operation of the deceleration control device of FIG. 16.
Figure 20:
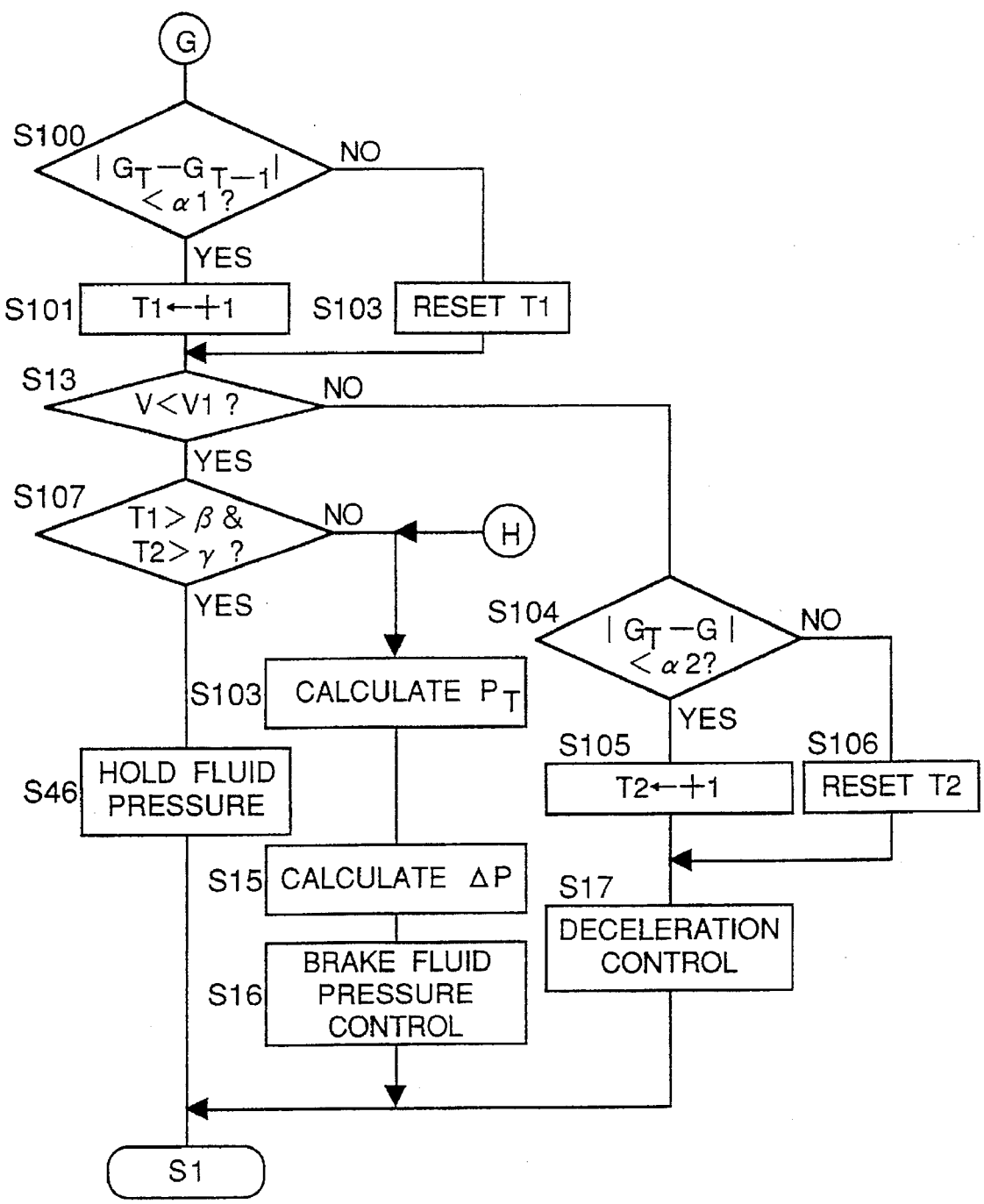
FIG. 20 is a flowchart showing a second half portion of the second example of operation of the deceleration control device of FIG. 16.

Hereinafter, a second example of operation of the deceleration control device 4a of FIG. 16 is described with reference to flowcharts of FIGS. 19 and 20. In FIGS. 19 and 20, steps identical with those of FIGS. 3A to 8 showing the first example of operation of the deceleration control device 4 of the first embodiment and FIGS. 17 and 18 showing the first example of operation of the deceleration control device 4a of the second embodiment are designated by reference numerals identical with those of FIGS. 3A to 8, 17 and 18 and only their differences from FIGS. 17 and 18 are described here. Meanwhile, all processings in the flowchart of FIG. 20 are performed by the fourth arithmetic unit 9.

FIG. 20 is different from FIG. 18 in that in FIG. 20, in the case of "NO" at step S100, the program flow proceeds directly to step S103 through elimination of step S102 of FIG. 18 and in the case of "NO" at step S104, the program flow proceeds directly to step S106. Furthermore, FIG. 20 is different from FIG. 18 in that in FIG. 20, in the case of "YES" at step S107, step S46 (FIG. 7) for holding the brake fluid pressure is performed so as to return to step S1 and in the case of "NO" at step S107, processings of steps S14 to S16 shown in FIG. 3B are performed.

Furthermore, FIG. 19 is different from FIG. 17 in that in FIG. 19, in the case of "YES" at step S4, the program flow proceeds to step S14 shown in FIG. 20.

Figure 21:
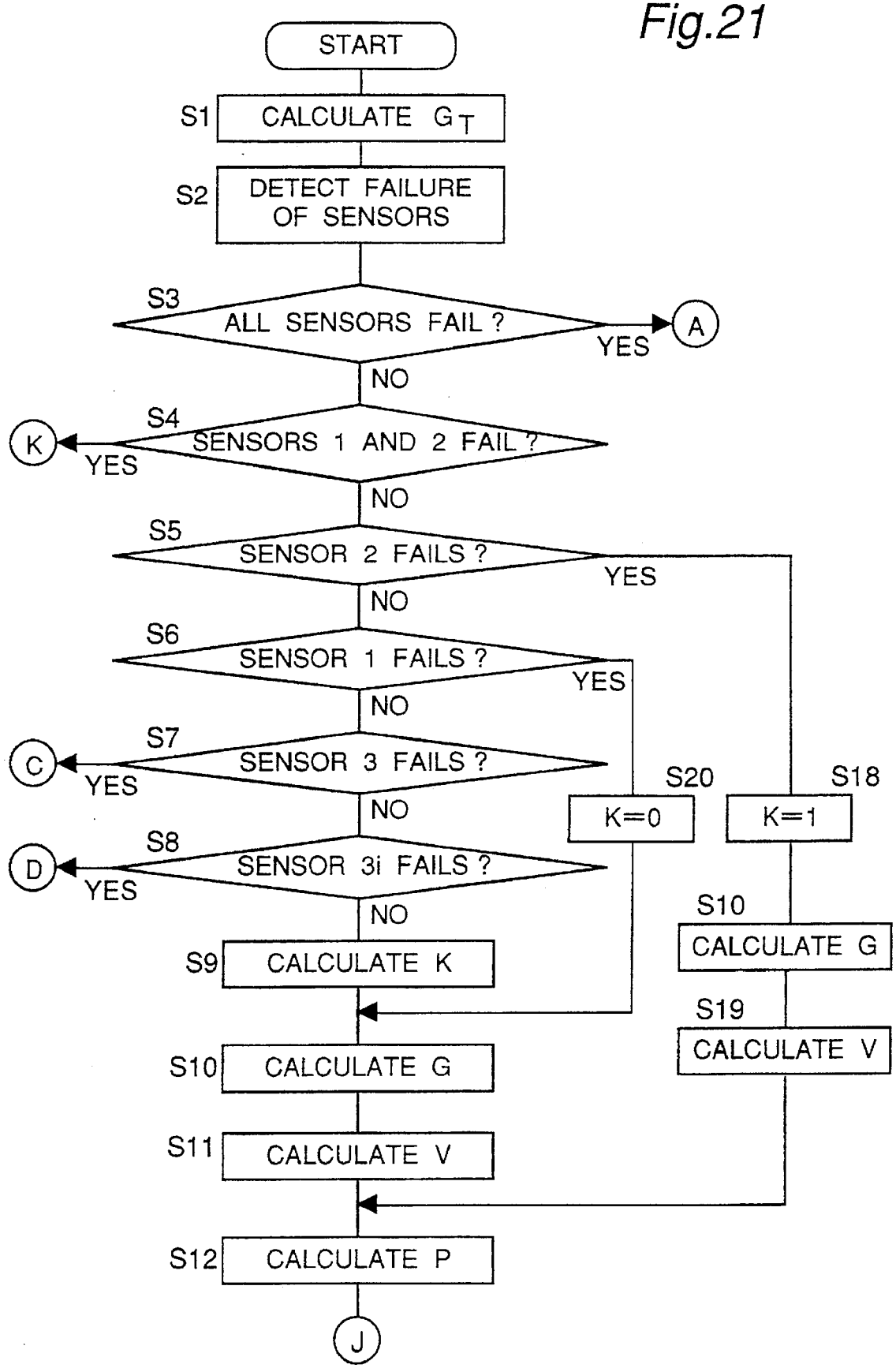
FIG. 21 is a flowchart showing a first half portion of a third example of operation of the deceleration control device of FIG. 16.
Figure 22:
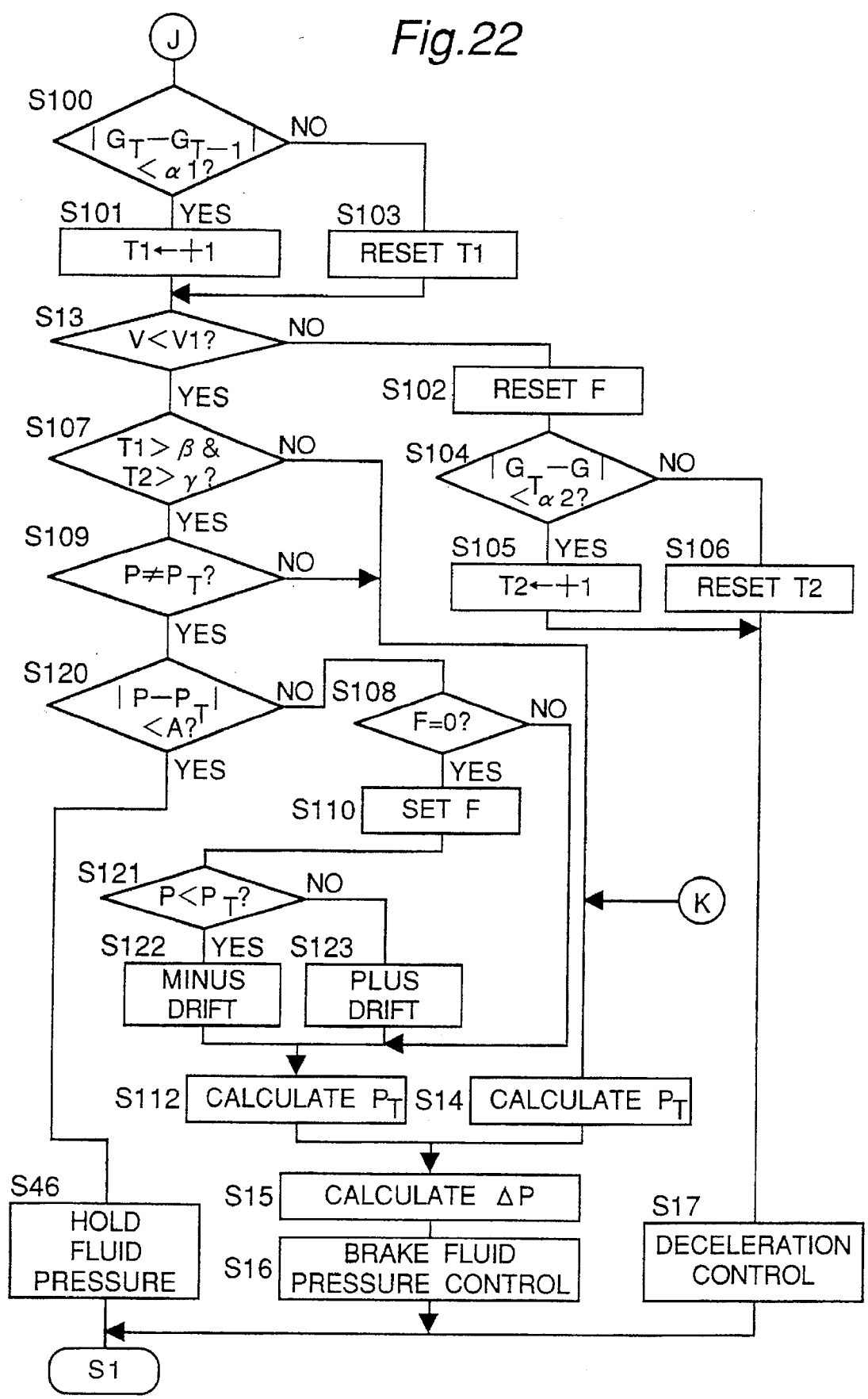
FIG. 22 is a flowchart showing a second half portion of the third example of operation of the deceleration control device of FIG. 16.

Hereinafter, a third example of operation of the deceleration control device 4a is described with reference to flowcharts of FIGS. 21 and 22. In FIGS. 21 and 22, steps identical with those of FIGS. 3A to 8 indicative of the first example of operation of the deceleration control device 4 of the first embodiment and FIGS. 17 to 20 indicative of the first and second examples of operation of the deceleration control device 4a of the second embodiment are designated by reference numerals identical with those of FIGS. 3A to 8 and 17 to 20 and only their differences from FIGS. 19 and 20 showing the second example of operation of the deceleration control device 4a are described here.

FIG. 22 is different from FIG. 20 in that in FIG. 22, step S102 is added between steps S13 and S104 of FIG. 20 and in steps following step S107. Thus, steps S107 or more are described here. Meanwhile, in FIG. 22, all steps S100 or more are performed by the fourth arithmetic unit 9.

In FIG. 22, if it is found at step S107 that not only the count of the first counter T1 of the first timer 10 exceeds the predetermined value β but the count of the second counter T2 of the second timer 11 exceeds the predetermined value γ, namely, in the case of "YES" at step S107, the program flow proceeds to step S109. If it is found at step S109 that the actual brake fluid pressure P is different from the target brake fluid pressure $P_T$, namely, in the case of "YES" at step S109, the program flow proceeds to step S120. On the other hand, if it is found at step S109 that the actual brake fluid pressure P is equal to the target brake fluid pressure $P_T$, namely, in the case of "NO" at step S109, processings of steps S14 or more in FIG. 3B are performed.

If it is found at step S120 that an absolute value of a difference between the actual brake fluid pressure P and the target brake fluid pressure $P_T$ is smaller than a predetermined value A leading to permissible error of the braking effectiveness of the vehicle, namely, in the case of "YES" at step S120, step S46 (FIG. 7) for holding the brake fluid pressure is performed and then, the program flow returns to step S1. On the contrary, if it is found at step S120 that the absolute value of the difference between the actual brake fluid pressure P and the target brake fluid pressure $P_T$ is not less than the predetermined value A, namely, in the case of "NO" at step S120, the program flow proceeds to step S108. At step S108, it is judged whether or not the flag F is reset. In the case of "YES" at step S108, the flag F is set at step S110 and then, the program flow proceeds to step S121. On the other hand, in the case of "NO" at step S108, processings of steps S112 or more in FIG. 18 are performed.

If it is found at step S121 that the target brake fluid pressure $P_T$ exceeds the actual brake fluid pressure P, namely, in the case of "YES" at step S121, the program flow proceeds to step S122. At step S122, the braking effectiveness of the vehicle are corrected by drifting the braking effectiveness of the vehicle through the predetermined value A in a minus direction along an axis indicative of the brake fluid pressure.

On the other hand, if it is found at step S121 that the target brake fluid pressure $P_T$ is not more than the actual brake fluid pressure P, namely, in the case of "NO" at step S121, the program flow proceeds to step S123. At step S123, the braking effectiveness of the vehicle are corrected through the predetermined distance A in a plus direction along the axis indicative of the brake fluid pressure and then, processings of steps S112 or more in FIG. 18 are performed.

Hereinafter, effects gained in the claims of the present invention are described. In the deceleration control device of Claim 1, when it is judged that the speed of the vehicle is low, the target brake fluid pressure corresponding to the target deceleration is calculated by the predetermined braking effectiveness of the vehicle and the brake fluid pressure control command value is calculated so as to cause the actual brake fluid pressure to coincide with the target brake fluid pressure by feeding the difference between this target brake fluid pressure and the actual brake fluid pressure back to the actual brake fluid pressure such that a desired deceleration is obtained. Thus, when the speed of the vehicle is not low, the ordinary deceleration control is performed. Meanwhile, when the speed of the vehicle is low, the target deceleration is replaced with the target brake fluid pressure by the predetermined relation between the deceleration and the brake fluid pressure and a command on the brake fluid pressure is issued such that the actual brake fluid pressure coincides with the target brake fluid pressure. As a result, shocks of the vehicle prior to stop of the vehicle can be lessened by simple calculations.

In the deceleration control device of Claim 2, when it is considered that the speed of the vehicle is low, the target brake fluid pressure corresponding to the target deceleration is calculated in accordance with learned braking effectiveness of the vehicle and the brake fluid pressure control command value is calculated so as to cause the actual brake fluid pressure to coincide with the target brake fluid pressure by feeding the difference between the target brake fluid pressure and the actual brake fluid pressure back to the actual brake fluid pressure such that a desired deceleration is obtained. By using the braking effectiveness of the vehicle obtained by learning during deceleration control without using the predetermined braking effectiveness of the vehicle, a desired deceleration can be obtained even in case the braking effectiveness of the vehicle change when the brake fluid pressure is controlled at the time of low speed of the vehicle.

In the deceleration control device of Claim 3, when it is judged that the target deceleration is constant for the predetermined period, that the actual deceleration is sufficiently approximate to the target deceleration and that the speed of the vehicle is low and the calculated target brake fluid pressure is different from the actual brake fluid pressure, the braking effectiveness of the vehicle are corrected so as to cause the actual brake fluid pressure to coincide with the target brake fluid pressure at that time point such that a desired deceleration is obtained. When deceleration control has been changed over to control of the brake fluid pressure while the actual deceleration is sufficiently approximate to the target deceleration, relation for converting the target deceleration into the target brake fluid pressure can be corrected easily and a desired deceleration can be obtained accurately.

In the deceleration control device of Claim 4, when it is judged that the target deceleration is constant for the predetermined period, that the actual deceleration is sufficiently approximate to the target deceleration and that the speed of the vehicle is low and the calculated target brake fluid pressure is different from the actual brake fluid pressure, the deceleration in deceleration control is maintained without feeding the difference between the target brake fluid pressure and the actual brake fluid pressure back to the actual brake fluid pressure if the absolute value of the difference between the target brake fluid pressure and the actual brake fluid pressure is smaller than the predetermined value. Therefore, in case the actual deceleration is sufficiently approximate to the target deceleration during deceleration control even if the actual brake fluid pressure is different from the target brake fluid pressure at the time when deceleration control has been changed over to control of the brake fluid pressure, shocks of the vehicle prior to stop of the vehicle can be lessened by maintaining braking force without feeding the difference between the actual brake fluid pressure and the target brake fluid pressure back to the actual brake fluid pressure. As a result, shocks of the vehicle prior to stop of the vehicle can be lessened quite easily and the target deceleration can be maintained.

In the deceleration control device of Claim 5, in case the absolute value of the difference between the actual brake fluid pressure and the target brake fluid pressure is not less than the predetermined value A when it is judged that the target deceleration is constant for the predetermined period, that the actual deceleration is sufficiently approximate to the target deceleration and that the speed of the vehicle is low and the calculated target brake fluid pressure is different from the actual brake fluid pressure, the difference between the actual brake fluid pressure and the target brake fluid pressure is fed back to the actual brake fluid pressure so as to cause the actual brake fluid pressure to coincide with the target brake fluid pressure. As a result, change of the braking effectiveness of the vehicle can be absorbed.

In the deceleration control device of Claim 6, even when one of the fluid pressure sensors of the brake fluid pressure detection means fails, a brake fluid pressure of the defective fluid pressure sensor can be complemented by calculating that of one of the remaining fluid pressure sensors. Therefore, even if one of the fluid pressure sensors of the brake fluid pressure detection means fails, highly reliable deceleration control can be performed.

In the deceleration control device of Claim 7, by using the weight factor determined in accordance with the amount of change of the acceleration or deceleration in the predetermined period, the first arithmetic unit calculates the actual deceleration of the vehicle from the weighted mean value of the acceleration or deceleration and the time-differential value of the speed obtained from the speed detection means. Therefore, by changing the weight, the deceleration can be calculated accurately in accordance with the amount of change of the acceleration or deceleration obtained from the acceleration or deceleration detection means or the differential value of the speed obtained from the speed detection means and thus, highly reliable deceleration control can be performed in view of both of characteristics of the acceleration or deceleration detection means and those of the speed detection means.

In the deceleration control device of Claim 8, when the acceleration or deceleration detection device fails, the time-differential value of the speed obtained from the speed detection means is employed as the actual deceleration. Thus, even when the acceleration or deceleration detection device fails, highly reliable deceleration control can be performed.

In the deceleration control device of Claim 9, when the speed detection means fails, the acceleration or deceleration obtained from the acceleration or deceleration detection means is employed as the actual deceleration. Therefore, even when the speed detection means fails, highly reliable deceleration control can be performed.

In the deceleration control device of Claim 10, when the speed detection means fails, the integral value of the acceleration or deceleration obtained from the acceleration or deceleration detection means is employed as the speed of the vehicle. Accordingly, even when the speed detection means fails, judgement of low speed can be formed. As a result, deceleration control and fluid pressure control can be performed selectively and thus, highly reliable deceleration control can be performed.

In the deceleration control device of Claim 11, when both of the speed detection means and the acceleration or deceleration detection means fail, brake fluid pressure control is performed such that the actual brake fluid pressure coincides with the target brake fluid pressure calculated from the target deceleration by the predetermined braking effectiveness of the vehicle. Hence, even when both of the speed detection means and the acceleration or deceleration detection means fail, highly reliable deceleration control can be performed.

In the deceleration control device of Claim 12, when both of the speed detection means and the acceleration or deceleration detection means fail, the braking effectiveness of the vehicle obtained by learning during deceleration control performed prior to the failures are employed without using the predetermined braking effectiveness of the vehicle. Therefore, even in case the braking effectiveness of the vehicle change from the predetermined braking effectiveness of the vehicle, desired deceleration can be obtained.

In the deceleration control device of Claim 13, when the brake fluid pressure detection means fails and it is considered that the speed of the vehicle is low, deceleration at the time of deceleration control is maintained by holding braking force unconditionally. Thus, when the brake fluid pressure detection means fails, shocks of the vehicle produced prior to stop of the vehicle can be lessened.

In the deceleration control device of Claim 14, when all of the speed detection means, the acceleration or deceleration detection means and the brake fluid pressure detection means fail, the brake fluid pressure control command value is calculated on the basis of the predetermined braking effectiveness of the vehicle and the characteristics of the brake fluid pressure detection means specified at the time of designing. Therefore, when all of the speed detection means, the acceleration or deceleration detection means and the brake fluid pressure detection means fail, the vehicle can be stopped safely without prohibiting brake fluid pressure control.

The present invention is not restricted to the above first and second embodiments and can be modified variously. Therefore, the scope of the present invention, needless to say, should be defined by the claims.

What is claimed is:

1. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the actual brake fluid pressure, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein when the speed of the vehicle inputted to the fourth arithmetic unit from the second arithmetic unit is low, the fourth arithmetic unit calculates by predetermined braking effectiveness of the vehicle a target brake fluid pressure corresponding to the target deceleration and calculates the brake fluid pressure control command value such that the actual brake fluid pressure coincides with the target brake fluid pressure.

2. A deceleration control device as claimed in claim 1, wherein the fourth arithmetic unit calculates the target brake fluid pressure by learned braking effectiveness of the vehicle which are formulated on the basis of a brake fluid pressure calculated from a first brake fluid pressure calculated in accordance with the actual deceleration by the predetermined braking effectiveness of the vehicle and from the actual brake fluid pressure.

3. A deceleration control device as claimed in claim 2, wherein when the target deceleration is constant for a predetermined period, an absolute value of a difference between the actual deceleration and the target deceleration is smaller than a predetermined value and the actual brake fluid pressure is different from the target brake fluid pressure, the fourth arithmetic unit corrects the predetermined braking effectiveness of the vehicle by a difference between the actual brake fluid pressure and the target brake fluid pressure such that the actual brake fluid pressure coincides with the target brake fluid pressure.

4. A deceleration control device as claimed in claim 1, wherein when the target deceleration is constant for a first predetermined period and a state that an absolute value of a difference between the actual deceleration and the target deceleration is smaller than a predetermined value lasts for a second predetermined period, the fourth arithmetic unit outputs the control signal to the brake fluid pressure control means so as to cause the brake fluid pressure control means to hold the actual brake fluid pressure even if the speed of the vehicle is low and the actual brake fluid pressure is different from the target brake fluid pressure.

5. A deceleration control device as claimed in claim 4, when an absolute value of a difference between the actual brake fluid pressure and the target brake fluid pressure is not less than a further predetermined value, the fourth arithmetic unit calculates the brake fluid pressure control command value such that the actual brake fluid pressure coincides with the target brake fluid pressure.

6. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the brake fluid pressures, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein when the brake fluid pressure detection means includes a plurality of fluid pressure sensors and an arbitrary one of the fluid pressure sensors fails, the fourth arithmetic unit calculates the brake fluid pressure control command value by using a calculated brake fluid pressure rather than a brake fluid pressure detected by one of the remaining fluid pressure sensors having a predetermined relation with the arbitrary one of the fluid pressure sensors.

7. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the brake fluid pressures, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein by using a weight factor determined in accordance with an amount of change of the acceleration or deceleration in a predetermined period, the first arithmetic unit calculates the actual deceleration of the vehicle from a weighted mean value of the acceleration or deceleration and a time-differential value of the speed obtained from the speed detection means.

8. A deceleration control device as claimed in claim 7, wherein when the acceleration or deceleration detection means fails, the first arithmetic unit calculates the actual deceleration of the vehicle from only the time-differential value of the speed obtained from the speed detection means.

9. A deceleration control device as claimed in claim 7, wherein when the speed detection means fails, the first arithmetic unit calculates the actual deceleration of the vehicle from only the acceleration or deceleration obtained from the acceleration or deceleration detection means.

10. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the brake fluid pressures, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein when the speed detection means fails, the second arithmetic unit integrates with respect to time the acceleration or deceleration obtained from the acceleration or deceleration detection means so as to calculate the speed of the vehicle.

11. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the brake fluid pressures, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein when both of the speed detection means and the acceleration or deceleration detection means fail, the fourth arithmetic unit calculates the brake fluid pressure control command value such that the actual brake fluid pressure coincides with a target brake fluid pressure calculated from the target deceleration by predetermined braking effectiveness of the vehicle.

12. A deceleration control device as claimed in claim 11, wherein when both of the speed detection means and the acceleration or deceleration means fail, the fourth arithmetic unit calculates the target brake fluid pressure corresponding to the target deceleration, by learned braking effectiveness of the vehicle which are formulated prior to failure of the speed detection means or the acceleration or deceleration detection means on the basis of a brake fluid pressure calculated from a brake fluid pressure calculated in accordance with the actual deceleration by the predetermined braking effectiveness of the vehicle and from the actual brake fluid pressure.

13. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the brake fluid pressures, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein when all of the brake fluid pressure detection means fail and the speed of the vehicle is low, the fourth arithmetic unit outputs the control signal to the brake fluid pressure control means so as to cause the brake fluid pressure control means to hold the actual brake fluid pressure irrespective of the actual deceleration.

14. A deceleration control device for a vehicle provided with a speed detection means for detecting a speed of the vehicle, an acceleration or deceleration detection means for detecting an acceleration or deceleration of the vehicle, a brake fluid pressure detection means for detecting an actual brake fluid pressure from at least two brake systems of the vehicle and a brake fluid pressure control means for controlling the brake fluid pressures, the deceleration control device comprising:

a first arithmetic unit for calculating an actual deceleration of the vehicle from a signal from the speed detection means and a signal from the acceleration or deceleration detection means;

a second arithmetic unit for calculating a speed of the vehicle from the signal from the speed detection means;

a third arithmetic unit for calculating a target deceleration of the vehicle; and a fourth arithmetic unit for calculating a brake fluid pressure control command value such that the actual deceleration coincides with the target deceleration, which is connected to the first to third arithmetic units and the brake fluid pressure control means so as to output to the brake fluid pressure control means a control signal corresponding to the brake fluid pressure control command value;

wherein when all of the speed detection means, the acceleration or deceleration detection means and the brake fluid pressure detection means fail, the fourth arithmetic unit calculates the brake fluid pressure control command value on the basis of predetermined braking effectiveness of the vehicle and a predetermined relation between the brake fluid pressure control command value and an amount of change of a brake fluid pressure.

* * * * *

UNITED STATES PATENT AND TRADEMARK OFFICE
CERTIFICATE OF CORRECTION

PATENT NO. : 5,647,647
DATED : July 15, 1997
INVENTOR(S) : K. KATO et al.

It is certified that error appears in the above-indentified patent and that said Letters Patent is hereby corrected as shown below:

At column 23, lines 10/11 (claim 6, lines 27/28), delete "an arbitrary";

At column 23, line 16 (claim 6, line 33), delete "arbitrary".

Signed and Sealed this

Twenty-eighth Day of July, 1998

Attest:

BRUCE LEHMAN

Attesting Officer

Commissioner of Patents and Trademarks